United States Patent Office 3,048,581
Patented Aug. 7, 1962

3,048,581
ACETALS AND KETALS OF 16,17-DIHYDROXY STEROIDS
Josef Fried, Princeton, N.J., assignor to Olin Mathieson Chemical Corporation, New York, N.Y., a corporation of Virginia
No Drawing. Filed Apr. 25, 1960, Ser. No. 24,230
37 Claims. (Cl. 260—239.55)

This application is a continuation-in-part of my applications: Serial No. 677,205, filed August 9, 1957, now abandoned; Serial No. 707,463, filed January 7, 1958, now Patent No. 2,975,172, granted March 14, 1961; Serial No. 714,047, filed February 10, 1958, now abandoned; Serial No. 714,076, filed February 10, 1958, now abandoned; Serial No. 718,966, filed March 4, 1958, now abandoned; Serial No. 772,404, filed November 7, 1958, which in turn is a continuation-in-part of said Serial No. 677,205, and Serial No. 719,504, filed March 6, 1958, now abandoned; Serial No. 772,405, filed November 7, 1958, now abandoned; and Serial No. 797,867, filed March 9, 1959, now abandoned.

This invention relates to, and has for its object the provision of a method of preparing physiologically active steroids, and to the physiologically active steroids produced thereby.

It has unexpectedly been found that when a steroid of the 16α,17α-dihydroxy 3,20-diketo-Δ⁴-pregnene series containing either a β-hydroxy or keto group in the 11-position is ketalized or acetalized by reaction with a ketone or an aldehyde of at least two carbon atoms, thereby forming the corresponding 16,17-cyclic ketal or acetal derivative, the physiological activity of the starting steroid is increased. This discovery is surprising since a priori it would have been thought that such a treatment would either destroy the activity, or at best, because of in vivo hydrolysis, yield a compound no more active than the starting steroidal substance.

In its broadest aspects, therefore, this invention relates to the discovery that the physiological activity of a 16α,-17α-dihydroxy-3,20-diketo steroid of the Δ⁴-pregnene series (including the pregnadiene and pregnatriene series) having either an 11β-hydroxy or 11-keto group can be increased by forming a 16,17-cyclic acetal or ketal derivative thereof with an aldehyde of at least two carbon atoms or a ketone.

Although any such steroid can be treated in accordance with the process of this invention to yield the new 16,17-cyclic acetal and ketal derivatives of this invention, the prefererd compounds of this invention are those of the general formula

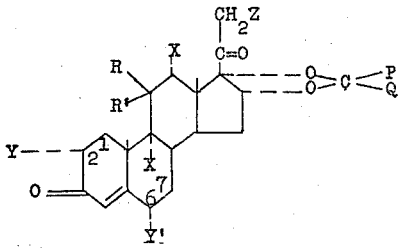

wherein the 1,2 and 6,7-positions are saturated or double-bonded; R is hydrogen, R' is hydroxy or α-acyloxy, or together R and R' is keto; each X is hydrogen, halogen, hydroxy, lower alkoxy, or lower alkyl, at least one X being hydrogen; Y and Y' are hydrogen or methyl; Z is hydrogen, halogen, hydroxy or acyloxy; P is hydrogen, lower alkyl, halo lower alkyl, carboxy lower alkyl (or a salt or ester thereof), monocyclic cycloalkyl, monocyclic aryl, monocyclic aryl lower alkyl, monocyclic heterocyclic or monocyclic heterocyclic lower alkyl; Q is lower alkyl, halo lower alkyl, carboxy lower alkyl (or a salt or ester thereof), monocyclic cycloalkyl, monocyclic aryl, monocyclic aryl lower alkyl, monocyclic heterocyclic or monocyclic heterocyclic lower alkyl or together with the carbon atom to which they are joined P and Q are cycloalkyl or monocyclic heterocyclic. Particularly preferred are those compounds wherein the 1,2-position is double-bonded, R is hydrogen, R' is β-hydroxy or together R and R' is keto; X is halogen (optimally fluoro), Y and Y' are hydrogen; Z is hydroxy or acyloxy; and P and Q are each lower alkyl.

The compounds of this invention are prepared by interacting a 16α,17α-dihydroxy-3,20-diketo steroid of the Δ⁴-pregnene series, having either an 11β-hydroxy or 11-keto group, with an aldehyde of at least two carbon atoms or ketone. The reaction is preferably carried out by treating a suspension or solution of the steroid in the aldehyde or ketone (or an organic solvent if the aldehyde or ketone is a solid) with an acid catalyst (e.g., perchloric acid, p-toluene sulfonic acid, and hydrochloric acid), neutralizing the acid and recovering the cyclic acetal or ketal derivative formed.

Particularly preferred as starting steroidal materials are those of the general formula

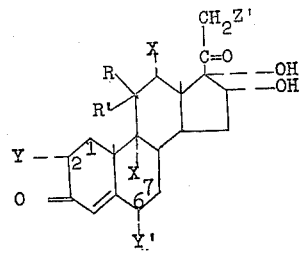

wherein the 1,2 and 6,7-positions are saturated or double-bonded, R, R', X, Y and Y' are as hereinbefore defined, and Z' is hydrogen, halogen or hydroxy. Particularly preferred carbonyl reactants are those of the general formula:

wherein P and Q are as hereinbefore defined.

Among the suitable starting steroids utilizable in the process of this invention may be mentioned:

16α-hydroxyhydrocortisone,
16α-hydroxycortisone,
16α-hydroxyprednisolone,
16α-hydroxyprednisone,
  9α-halo-16α-hydroxyhydrocortisones (i.e., 9α-fluoro-16α-hydroxyhydrocortisone,
  9α-chloro16α-hydroxyhydrocortisone,
  9α-bromo-16α-hydroxyhydrocortisone and 9α-iodo-16α-hydroxyhydrocortisone),
  9α-halo-16α-hydroxycortisones,
  9α-halo-16α-hydroxyprednisolone (e.g., triamcinolone),
  9α-halo-16α-hydroxyprednisones,
  12α-halo-16α-hydroxyhydrocortisones (e.g. 12α-fluoro-16α-hydroxyhydrocortisone),
  12α-halo-16α-hydroxycortisones (e.g. 12α-chloro-16α-hydroxycortisone),
  12α-halo-16α-hydroxyprednisolones (e.g. 12α-fluoro-16α-hydroxyprednisolone),
  12α-halo-16α-hydroxyprednisones,
6α-methyl-16α-hydroxyhydrocortisone,
6α-methyl-16α-hydroxycortisone,
6α-methyl-16α-hydroxyprednisolone,
6α-methyl-16α-hydroxyprednisone,
2α-methyl-16α-hydroxyhydrocortisone,
2α-methyl-16α-hydroxycortisone, 2-methyl-16α-hydroxyprednisolone,
2-methyl-16α-hydroxyprednisone,
2α,6α-dimethyl-16α-hydroxyhydrocortisone,
2α,6α-dimethyl-16α-hydroxycortisone,
9α-halo-2-methyl-16α-hydroxy prednisolones (e.g. 2-methyltriamcinolone),
9α-halo-6α-methyl-16α-hydroxyhydrocortisones (e.g., 9α-fluoro-6α-methyl-16α-hydroxyhydrocortisone),
9α-halo-6α-methyl-16α-hydroxyprednisolones (e.g. 6α-methyl triamcinolone),
16α-hydroxy-6-dehydrocortisone,
16α-hydroxy-6-dehydrocortisone,
16α-hydroxy-6-dehydroprednisolone,
9α-halo-16α-hydroxy-6-dehydroprednisolones,
11β,16α,17α-trihydroxyprogesterone,
11-keto-16α,17α-dihydroxyprogesterone,
11β,16α,17α-trihydroxy-1-dehydroprogesterone,
11-keto-16α,17α-dihydroxy-1-dehydroprogesterone,
9α-halo-11β,16α,17α-trihydroxyprogesterones (e.g. 9α-chloro-11β,16α,17α-trihydroxyprogesterone and 9α-fluoro-11β,16α,17α-trihydroxyprogesterone),
9α-halo-16α,17α-dihydroxy-11-keto-progesterones (e.g. 9α-fluoro-16,17α-dihydroxy-11-keto-progesterone),
9α-halo-11β,16α,17α-trihydroxy-1-dehydroprogesterones (e.g., 9α-fluoro-11β,16α,17α-trihydroxy-1-dehydroprogesterone),
12α-halo-11β,16α,17α-trihydroxyprogesterones (e.g. 12α-fluoro-11β,16α,17α-trihydroxyprogesterone),
12α-halo-11β,16α,17α-trihydroxy-1-dehydroprogesterones (e.g., 12α-fluoro-11β,16α,17α-trihydroxy-1-dehydroprogesterone),
21-halo-11β,16α,17α-trihydroxyprogesterones (e.g. 21-fluoro-11β,16α,17α-trihydroxyprogesterone),
21-halo-11β,16α,17α-trihydroxy-1-dehydroprogesterones,
9α,21-dihalo-11β,16α,17α-trihydroxyprogesterones (e.g. 9α,21-difluoro-11β,16α,17α-trihydroxyprogesterone),
9α,21-dihalo-6α-methyl-11β,16α,17α-trihydroxy-1-dehydroprogeterones,
16α-hydroxy-12α-(lower alkyl)hydrocortisones (e.g. 16α-hydroxy-12α-methyl-hydrocortisone),
16α-hydroxy-12α-(lower alkyl)-cortisones (e.g. 16α-hydroxy-12α-methylcortisone),
16α-hydroxy-9α-(lower alkyl)-hydrocortisones (e.g. 16α-hydroxy-9α-methylhydrocortisone),
16α-hydroxy-9α-(lower alkyl)cortisones (e.g. 16α-hydroxy-9α-methyl-cortisone),
16α-hydroxy-12α-(lower alkyl)prednisolone (e.g. 16α-hydroxy-12α-methylprednisolone),
16α-hydroxy-12α-(lower alkyl)-prednisones,
16α-hydroxy-9α-(lower alkyl)prednisolones (e.g. 16α-hydroxy-9α-methylprednisolone),
16α-hydroxy-9α-(lower alkyl)prednisones,
12α-(lower alkyl)-11β,16α,17α-trihydroxyprogesterones (e.g. 12α-methyl-11β,16α,17α-trihydroxyprogesterone),
9α-(lower alkyl)-11β,16α,17α-trihydroxyprogesterones (e.g. 9α-methyl-11β,16α,17α-trihydroxyprogesterone),
12α-(lower alkyl)-11-keto-16α,17α-dihydroxyprogesterones,
9α-(lower alkyl)-11-keto-16α,17α-dihydroxyprogesterones,
12α-(lower alkyl)-$\Delta^{4,6}$-pregnadiene-11β,16α,17α-triol-3,20-diones,
9α-(lower alkyl)-$\Delta^{4,6}$-pregnadiene-11β,16α,17α-triol-3,20-diones,
12α-(lower alkyl)-$\Delta^{1,4}$-pregnadiene-11β,16α,17α-triol-3,20-diones,
9α-(lower alkyl)-$\Delta^{1,4}$-pregnadiene-11β,16α,17α-triol-3,20-diones,
12α-(lower alkyl)-$\Delta^{1,4}$-pregnadiene-16α,17α-diol-3,11,20-triones,
9α-(lower alkyl)-$\Delta^{1,4}$-pregnadiene-16α,17α-diol-3,11,20-triones,
9α-(lower alkyl)-$\Delta^{1,4,6}$-pregnatriene-11β,16α,17α-diol-3,20-diones,
12α-(lower alkyl)-$\Delta^{1,4,6}$-pregnatriene-11β,16α,17α-triol-3,20-diones,
12α-(lower alkyl)-$\Delta^{4}$-pregnene-11α,16α,17α,21-tetrol-3,20-diones (e.g. 12α-methyl-$\Delta^{4}$-pregnene-11α,16α,17α,21-tetrol-3,20-dione),
9α-(lower alkyl)-$\Delta^{4}$-pregnene-11α,16α,17α,21-tetrol-3,20-diones (e.g. 9α-methyl-$\Delta^{4}$-pregnene-11α,16α,17α,21-tetrol-3,20-dione),
12α-(lower alkyl)-$\Delta^{1,4}$-pregnadiene-11α,16α,17α,21-tetrol-3,20-diones,
9α-(lower alkyl)-$\Delta^{1,4}$-pregnadiene-11α,16α,17α,21-tetrol-3,20-diones,
12α-(lower alkyl)-$\Delta^{4}$-pregnene-11α,16α,17α-triol-3,20-diones,
9α-(lower alkyl)-$\Delta^{4}$-pregnene-11α,16α,17α-triol-3,20-diones,
12α-(lower alkyl)-$\Delta^{1,4}$-pregnadiene-11α,16α,17α-triol-3,20-diones,
9α-(lower alkyl)-$\Delta^{1,4}$-pregnadiene-11α,16α,17α-triol-3,20-diones and 11α-esters thereof, particularly esters with hydrocarbon carboxylic acids having less than 10 carbon atoms.

Suitable aldehyde and ketone reactants include lower alkanals of at least two carbon atoms, such as paraldehyde, propanal, and hexanal; di(lower alkyl)ketones, such as acetone, diethylketone, dibutylketone, methylethylketone, and methylisobutylketone; cycloalkanones, such as cyclobutanone, cyclopentanone, cyclohexanone, suberone, and cyclodexanone; mono and dicycloalkyl ketones, such as cyclohexylmethylketone and dicyclopropylketone, halo-lower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carbocyclic aromatic aldehydes, such as benzaldehyde, halobenzaldehydes (e.g. p-chlorobenzaldehyde and p-fluorobenzaldehyde), lower alkoxybenzaldehydes (e.g. o-anisaldehyde), di(lower alkoxy)benzaldehydes (e.g. veratraldehyde), hydroxybenzaldehydes (e.g. salicylaldehyde), dihydroxybenzaldehydes (e.g. resorcyaldehyde), lower alkyl benzaldehydes (e.g. m-tolualdehyde and p-ethylbenzaldehyde), di(lower alkyl)benzaldehydes (e.g. o,p-dimethyl-benzaldehyde), nitrobenzaldehydes, acylamidobenzaldehydes (e.g. N-acetylanthranilaldehyde), and cyanobenzaldehydes; monocyclic carbocyclic aromatic lower alkanals, such as phenylacetaldehyde, α-phenylpropionaldehyde, β-phenylpropionaldehyde, γ-phenylbutyraldehyde, and aromatically-substituted halo, lower alkoxy, hydroxy, lower alkyl, nitro, acylamido and cyano derivatives thereof; monocyclic heterocyclic aldehydes, such as picolinaldehydes, furfural, thiophene carbonals, and halo, lower alkoxy, hydroxy, lower alkyl, nitro, and cyano derivatives thereof; monocyclic heterocyclic lower alkanals; 1-(monocyclic carbocyclic aromatic)substituted lower alkanals, such as acetophenone, α,α,α-trifluoroacetophenone, propiophenone, butyrophenone, valerophenone, isocaprophenone, halophenyl lower alkyl ketones (e.g. p-chloroacetophenone and p-chloropropiophenone), (lower alkoxy)phenyl lower alkyl ketones (e.g. p-anisyl methyl ketone), di(lower alkoxy)phenyl lower alkyl ketones, hydroxy-phenyl lower alkyl ketones, dihydroxyphenyl lower alkyl ketones (e.g. resacetophenone), (lower alkyl)phenyl lower alkyl ketones (e.g. methyl p-tolyl ketone), di(lower alkyl)phenyl lower alkyl ketones (o,p-xylyl methyl ketone), nitrophenyl lower alkyl ketones (e.g. p-nitroacetophenone), acylamidophenyl lower alkyl ketones (e.g. acetyl anilines), and cyanophenyl lower alkyl ketones; benzophenone, and mono or bis substituted halo, lower alkoxy, hydroxy, lower alkyl, nitro, acylamido and cyano derivatives thereof; monocyclic carbocyclic aromatic lower alkanones, such as 1-phenyl-3-butanone and 1-phenyl-4-pentanone, and aromatically substituted derivatives thereof; 1-(monocyclic hetero-cyclic)substituted lower alkanals, such as 2-acetylfuran, 2-benzoylfuran, and 2-acetylthiophene; oxo substituted monocyclic heterocyclics, such as alloxan;

monocyclic heterocyclic lower alkanones; and oxo lower alkanoic acids such as glyoxylic, pyruvic, acetoacetic, β-ketopropionic, α-ketobutyric, levulinic, β-keto-caproic and β-ketocaprylic acid [as well as salts and esters thereof, such as the lower alkyl esters (e.g. methyl and ethyl)].

If a keto acid is employed as the acetalizing or ketalizing agent, although the free acid may be used as such, thereby directly yielding the free acid derivative, a preferred method for forming these derivatives is by an initial reaction with an ester of the desired ketoacid and subsequent hydrolysis of the ester derivative, as by treatment with a dilute mineral acid, to yield the free acid derivative. The free acid can then, if desired, be neutralized with any desired base (preferably ammonium hydroxide or an alkali metal hydroxide, such as sodium hydroxide and potassium hydroxide), to yield the salt derivative, or esterified by reaction with the desired alcohol (preferably a lower alkanal, such as methanol), in the usual manner, to yield an ester derivative, which differs from the initial ester reactant.

If a 21-ester derivative is the desired product, the corresponding 21-hydroxy steroid can be acylated in the usual manner. Thus, to prepare the 21-acyloxy derivatives wherein the acyl radical corresponds to the acyl radical of a hydrocarbon monocarboxylic acid of less than ten carbon atoms, either the acyl halide or acid anhydride of a lower alkanoic acid (e.g. acetic, propionic and tert-pentanoic acid), a monocyclic aryl carboxylic acid (e.g. benzoic and toluic acid) a monocyclic aryl lower alkanoic acid (e.g. phenacetic and β-phenylpropionic acid), a lower alkenoic acid, a cycloalkane carboxylic acid, or a cycloalkene carboxylic acid is employed as a reactant.

To prepare the 21-acyloxy derivatives wherein the acyl radical corresponds to the acyl radical of a hydrocarbon dicarboxylic acid of less than twelve carbon atoms either the acid anhydride or acyl halide (preferably acyl chloride) of a hydrocarbon dicarboxylic acid of less than twelve carbon atoms is used. Suitable hydrocarbon dicarboxylic acids include the lower alkanedioic acids (e.g. oxalic, malonic, succinic, glutaric, adipic, pimelic, suberic, azelaic, and sebacic acid), lower alkenedioic acids (e.g. maleic, fumaric, and citraconic acid), cycloalkanedioic acids, cycloalkenedioic acids, and monocyclic aromatic dicarboxylic acids (e.g. the phthalic acids). The preferred reactants are the inner anhydrides of lower alkanedioic acids having four to five carbon atoms (i.e. succinic anhydride and glutaric anhydride) and the anhydrides of the phthalic acids, and the esterification reaction is preferably conducted in the presence of an organic base (e.g. pyridine) at an elevated temperature. To prepare the water-soluble salts the 21-ester thus formed (containing a free carboxy group) is reacted either in situ or in a separate step with a base. Suitable bases include: inorganic bases, such as ammonium hydroxide, the alkali metal hydroxides (e.g. potassium hydroxide and sodium hydroxide), and the alkaline earth metal hydroxides; and organic bases, such as di(lower alkyl)amines and heterocyclic amines (e.g. pyridine). The alkali metal hydroxides are preferred.

To prepare the 21-phosphate derivatives, the 21-hydroxy steroid is reacted with an excess of phosphorous oxy chloride, and the resulting dichloride hydrolyzed by treatment with water in the presence of an organic base, such as pyridine.

Those compounds of this invention having a halogen in the 21-position can be prepared directly by employing as a starting steroid a compound containing the desired 21-halo group. However, the 21-halo final products are preferably prepared from the corresponding 21-hydroxy steroid derivative by reacting the latter with an alkane or aryl sulfonyl halide (sulfonyl chlorides being preferred, although other halides such as bromides and iodides may be used) to yield the new 21-alkane (or aryl) sulfonyloxy intermediates of this invention. Although any alkane (or aryl) sulfonyl chloride may be used, the alkane group is preferably a lower alkane, methanesulfonyl chloride (mesyl chloride) being particularly preferred, and the aryl group is preferably p-tolyl. The reaction is carried out by intermixing the 21-hydroxy steroid and sulfonyl halide under substantially anhydrous conditions and preferably in the cold (e.g. a temperature less than about 20° C.), in the presence of pyridine or other organic tertiary base.

The reaction results in the preparation of the new 21-alkane (or aryl) sulfonyloxy compounds of this invention, particularly steroids of the following general formula

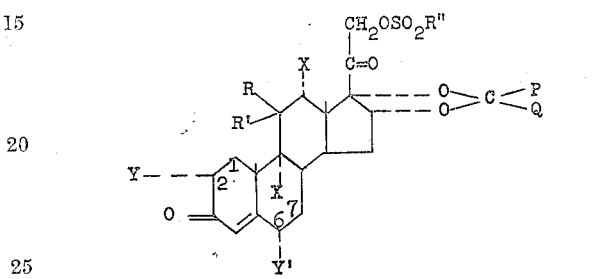

wherein the 1,2 and 6,7-positions are saturated or double-bonded; R, R', X, Y, Y', P and Q are as hereinbefore defined, and R'' is preferably lower alkyl or tolyl.

These 21-alkane (or aryl) sulfonyloxy intermediates are then reacted with a metal halide (such as an alkali metal halide, particularly potassium bifluoride, potassium fluoride, lithium chloride, lithium bromide and sodium iodide) in an organic solvent. The reaction is conducted at an elevated temperature (e.g. at reflux), under substantially neutral conditions. The reaction results in the production of new 21-halo steroids of this invention having the general formula

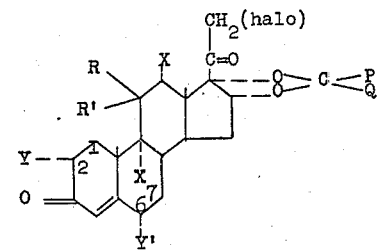

wherein the 1,2 and 6,7-positions are saturated or double-bonded; and R, R', X, Y, Y', P and Q are as hereinbefore defined. To prepare those compounds which represent a bis-steroidal compound joined together through the respective 21-groups, that is steroids of the general formula

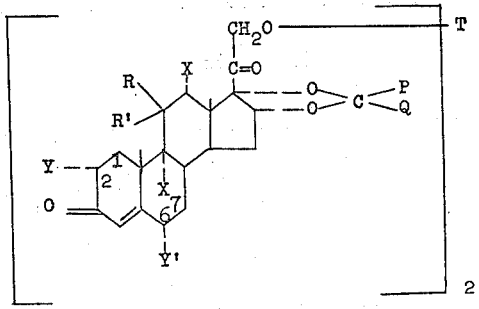

wherein the 1,2 and 6,7-positions are saturated or double-bonded; and R, R', X, Y, Y', P and Q are as hereinbefore defined, and T is a divalent radical, such as an inorganic radical (e.g. —SO— and —SO₂—) an organic radical [e.g. —CO— and —PO(R'')—, wherein R'' is an organic radical such as phenyl], a steriod of the general formula

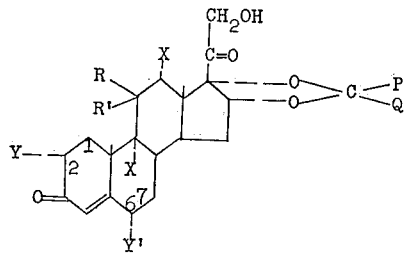

wherein the 1,2 and 6,7-positions are saturated or double-bonded, and R, R', X, Y, Y', P and Q are as hereinbefore defined, is reacted with a compound of the formula T(halo)$_2$, wherein the halo is preferably chloro. The reaction is preferably conducted in the presence of an organic base, such as pyridine, in the cold (i.e., below ambient temperature). Suitable reactants include thionyl chloride, sulfuryl chloride, phosgene and phenylphosphonyl dichloride.

All of the compounds of this invention are physiologically active substances which possess glucocorticoid and anti-inflammatory activity and hence can be used in lieu of known glucocorticoids such as hydrocortisone and cortisone in the treatment of rheumatoid arthritis, for which purpose they can be administered in the same manner as hydrocortisone, for example, the dosage being adjusted for the relative potency of the particular steroid. In addition, all of the compounds of this invention can be used topically in lieu of known glucocorticoids such as hydrocortisone in the treatment of skin conditions such as dermatitis, sunburn, neurodermatitis, eczema, and anogenital pruritus. The water-soluble salts of this invention, in contrast to the parent free 21-hydroxy steroid or the monobasic esters thereof, are particularly well suited for topical administration, especially for use in otic and ophthalmic preparations.

In those cases wherein the starting steroid reactants are new compounds, they can be prepared from the corresponding 16-desoxy derivative by subjecting the latter to the oxygenating action of a microorganism such as *Streptomyces roseochromogenus* in accordance with the method described in U.S. Patent No. 2,855,343. The 9α-halo-11β,16α,17α-trihydroxyprogesterone starting materials can be prepared as disclosed in my application, Serial No. 707,463, filed January 7, 1958, now Patent No. 2,975,172, granted March 14, 1961.

The following examples specifically disclose methods for preparing representative 16α,17α-dihydroxy starting steroidal materials. Neither these methods nor the compounds prepared constitute an aspect of the instant invention, but rather in certain instances these compounds and/or their method of preparation are separately claimed in appplications wherein I am the sole or joint inventor.

In the following examples all temperatures are in centigrade:

EXAMPLE A

*16α-Hydroxyprednisolone*

Prednisolone is fermented with *Streptomyces roseochromogenus* (Waksman No. 3689) following the procedure of Example 11 in Patent No. 2,855,343, with prednisolone substituted for the progesterone. The resulting 16α-hydroxyprednisolone is extracted from the filtered broth with methyl isobutyl ketone and recovered from the latter solvent by concentration and filtration of the resulting crystalline material.

EXAMPLE B

*12α-Fluoro-Δ⁴-Pregnene-11β,16α,17α-Triol-3,20-Dione*

(a) Preparation of 12α-fluoro-11β,16α-dihydroxyprogesterone: Microbiological hydroxylation of 12α-fluoro-11β-hydroxyprogesterone with *Streptomyces roseochromogenus* (Waksman No. 3689) as described in Example 11 of Patent No. 2,855,343 produces 16α-hydroxy-12α-fluoro-11β-hydroxyprogesterone.

(b) Preparation of 12α-fluoro-Δ⁴,¹⁶-pregnadiene-11β-ol-3,20-dione: A suspension of 400 mg. of 16α-hydroxy-12α-fluoro-11β-hydroxyprogesterone and 1.2 g. of aluminum tertiary butylate in 120 ml. of anhydrous toluene is heated to reflux for 2 hours. The cooled reaction mixture is washed with dilute hydrochloric acid, water, bicarbonate and again with water until neutral. The organic phase is dried over sodium sulfate and the solvent removed in vacuo. The residual crystalline mass upon recrystallization from acetone-hexane furnishes pure 12α-fluoro-Δ⁴,¹⁶-pregnadiene-11β-ol-3,20-dione.

(c) Preparation of 12α-fluoro-Δ⁴-pregnene-11β,16α,17α-triol-3,20-dione: To a solution of 77 mg. of the diene formed in section (b) and 0.1 ml. of pyridine in 5 ml. of benzene is added 65 mg. of osmium tetroxide. The mixture is allowed to stand in the dark for 18 hours, after which period precipitation of a brown crystalline material occurs. For decomposition of the osmate ester there is added to the mixture 7 ml. of water, 4.6 ml. of methanol, 700 mg. of sodium sulfite and 700 mg. of potassium bicarbonate and the resulting suspension is stirred for four hours at room temperature. After dilution with 20 ml. of chloroform the mixture is filtered through Celite and the precipitate washed thoroughly with chloroform. The layers are separated, the chloroform phase washed with water, dried over sodium sulfate and evaporated to dryness in vacuo. The crystalline residue is recrystallized from acetone-hexane, leaving the pure triol of the following properties: M.P. about 220–222° [α]$_D^{23}$+102° (c., 0.38 in CHCl$_3$);

$\lambda_{max.}^{alc.}$ 240 mμ (ε=16,200), $\lambda_{max.}^{Nujol}$ 2.90, 5.83, 6.02, 6.19μ

*Analysis.*—Calcd. for $C_{21}H_{29}O_5F$ (380.44): C, 66.29; H, 7.68. Found: C, 66.28; H, 7.67.

By applying the same sequence of reactions to 9α-fluoro-11β-hydroxyprogesterone, 9α-fluoro-Δ⁴-pregnane-11β,16α,17α-triol-3,20-dione is formed.

EXAMPLE C

*12α-Methyl-Δ⁴-Pregnane-11β,16α,17α-Triol-3,20-Dione*

(a) Preparation of 12α-methyl-11β,16α-dihydroxyprogesterone: Microbiological hydroxylation of 12α-methyl-11β-hydroxyprogesterone with *Streptomyces roseochromogenus* (Waksman No. 3689) as described in Patent No. 2,855,343 produces 16α-hydroxy-12α-methyl-11β-hydroxyprogesterone.

(b) Preparation of 12α-methyl-Δ⁴,¹⁶-pregnadiene-11β-ol-3,20-dione: A suspension of 400 mg. of 16α-hydroxy-12α-methyl-11β-hydroxyprogesterone and 1.2 g. of aluminum tertiary butylate in 120 ml. of anhydrous toluene is heated to reflux for 2 hours. The cooled reaction mixture is washed with dilute hydrochloride acid, water, bicarbonate and again with water until neutral. The organic phase is dried over sodium sulfate and the solvent removed in vacuo. The residual crystalline mass upon recrystallization from acetone-hexane furnishes pure 12α-methyl-Δ⁴,¹⁶-pregnadiene-11β-ol-3,20-dione.

(c) Preparation of 12α-methyl-Δ⁴-pregnene-11β,16α,17α-triol-3,20-dione: To a solution of 77 mg. of the diene formed in section (b) and 0.1 ml. of pyridine in 5 ml. of benzene is added 65 mg. of osmium tetroxide. The mixture is allowed to stand in the dark for 18 hours during which period precipitation of a brown crystalline material occurs. For decomposition of the osmate ester there is added to the mixture 7 ml. of water, 4.6 ml. of methanol, 700 mg. of sodium sulfite and 700 mg. of potassium bicarbonate and the resulting suspension is stirred for four hours at room temperature. After dilution with 20 ml. of chloroform the mixture is filtered through Celite and the precipitate washed thoroughly with chloroform. The layers are separated, the chloroform phase washed with water, dried over sodium sulfate and evaporated to dryness in vacuo. The crystalline residue is recrystallized from acetone-hexane, leaving the pure triol.

By applying the same sequence of reactions to 9α-methyl-11β-hydroxyprogesterone, 9α-methyl-Δ⁴-pregnene-11β,16α,17α-triol-3,20-dione is prepared.

EXAMPLE D

*12α-Chloro-16α-Hydroxycortisone*

Microbiological hydroxylation of 12α-chlorocortisone with *Streptomyces roseochromogenus* (Waksman No. 3689) as described in Patent No. 2,855,343 produces 12α-chloro-16α-hydroxycortisone.

EXAMPLE E

*12α-Fluoro-16α-Hydroxyhydrocortisone*

Microbiological hydroxylation of 12α-fluoro-hydrocortisone with *Streptomyces roseochromogenus* (Waksman No. 3689) as described in Patent No. 2,855,343 furnishes 12α-fluoro-16α-hydroxyhydrocortisone.

EXAMPLE F

*12α-Fluoro-16α-Hydroxyprednisolone*

Microbiological hydroxylation of 12α-fluoro-prednisolone with *Streptomyces roseochromogenus* (Waksman No. 3689) as described in Patent No. 2,855,343 furnishes 12α-fluoro-16α-hydroxy-prednisolone.

EXAMPLE G

*6α-Methyl-16α-Hydroxyprednisolone*

Microbiological hydroxylation of 6α-methyl prednisolone with *Streptomyces roseochromogenus* (Waksman No. 3689) as described in Patent No. 2,855,343 furnishes 6α-methyl-16α-hydroxyprednisolone.

EXAMPLE H

*9α-Fluoro-6α-Methyl-16α-Hydroxyprednisolone*

Microbiological hydroxylation of 9α-fluoro-6α-methyl prednisolone with *Streptomyces roseochromogenus* (Waksman No. 3689) as described in Patent No. 2,885,343 furnishes 9α-fluoro-6α-methyl-16α-hydroxyprednisolone.

The following examples are illustrative of the preparation of those compounds of this invention wherein the 21-position is unsubstituted or contains a hydroxyl group (Z is hydrogen or hydroxy). In the examples, the products are named either with a prefix or suffix to indicate the acetal or ketal group. Thus, the reaction product of triamcinolone with acetone is sometimes named 16,17-isopropylidene triamcinolone and other times triamcinolone acetonide. Moreover, in those instances where the correct chemical name would be cumbersome, a shortened name is used. Thus, the reaction product of triamcinolone and acetophenone is named merely the acetophenone derivative of triamcinolone. By this of course is meant the product formed by splitting out the elements of water between the oxo group of the acetophenone and the 16,17-dihydroxy groups of triamcinolone. All temperatures given in the examples are in centigrade:

EXAMPLE 1

*16α,17α-Isopropylidene Triamcinolone (16α,17α-Isopropylidene - 9α-Fluoro-Δ¹,⁴-Pregnadiene-11β,16α,17α,21-Tetrol-3,20-Dione)*

To a suspension of 500 mg. of triamcinolone in 75 ml. of acetone is added 0.05 ml. of 72% perchloric acid and the mixture agitated at room temperature for three hours. During this period the crystals gradually dissolve and the clear solution is neutralized with dilute bicarbonate and the acetone removed in vacuo. The resulting crystalline suspension is filtered and the crystals washed with water. The dried material (about 523 mg.) melts at about 275–278°. Recrystallization from 95% alcohol gives the pure acetonide of the following properties: M.P. about 288–290°; $[\alpha]_D^{23}+109°$ (c., 0.75 in CHCl₃);

$\lambda_{max.}^{alc.}$ 237.5 (ε=16,100); $\lambda_{max.}^{Nujol}$ 2.94, 5.83, 5.99, 6.17, 6.21μ

*Analysis.*—Calcd. for C₂₄H₃₁O₆F (434.49): C, 66.34; H, 7.19. Found: C, 65.95; H, 7.43.

This compound possesses about 20 times the activity of cortisone acetate in the rat liver glycogen assay and about 30 times the activity of cortisol in the cotton pellet anti-inflammatory assay.

EXAMPLE 2

To a suspension of 500 mg. of triamcinolone in 75 ml. of acetone is added 0.05 ml. of concentrated hydrochloric acid and the mixture is stirred at room temperature for 6 hours. It is then treated as described in Example 1 and gives pure triamcinolone acetonide melting at about 281–285°.

EXAMPLE 3

A suspension containing 100 mg. of triamcinolone and 50 mg. of p-tolene-sulfonic acid in 15 ml. of acetone is stirred for 21 hours at room temperature. The clear solution is worked up as described in Example 1 to give the pure acetonide having the same properties.

EXAMPLE 4

*16α,17α-(2'-Butylidene) Triamcinolone*

To a suspension of 100 mg. of triamcinolone in 15 ml. of methylethylketone is added 0.05 ml. of 72% perchloric acid, and the mixture stirred at room temperature for two hours. The resulting solution is neutralized with sodium bicarbonate solution and after addition of water the methylethylketone is evaporated in vacuo. The resulting crystals are filtered, washed with water and dried in vacuo. Recrystallization from acetone-hexane gives the pure isobutylidene derivative of the following properties: M.P. about 255–260°; $[\alpha]_D^{23}+92°$ (c., 0.39 in CHCl₃);

$\lambda_{max.}^{Nujol}$ 2.96, 5.85, 6.04, 6.20μ

*Analysis.*—Calcd. for C₂₅H₃₃O₆F (448.52): C, 66.94; H, 7.42. Found: C, 67.01; H, 7.41.

EXAMPLE 5

*16α,17α-(4'-Methyl-2'-Pentylidene) Triamcinolone*

To a suspension of 100 mg. of triamcinolone in 15 ml. of methylisobutylketone is added 0.05 ml. of 72% perchloric acid. The mixture is stirred at room temperature for 6 hours and the resulting solution extracted with dilute sodium bicarbonate solution, washed with water, the organic phase dried over sodium sulfate and the solvent evaporated in vacuo. Recrystallization of the resulting crystals from acetone-hexane gives the pure isohexylidene derivative of the following properties: M.P. about 246–250°; $[\alpha]_D^{23}+81.5°$ (c., 0.40 in chlf.);

$\lambda_{max.}^{Nujol}$ 2.90, 5.83, 6.02, 6.20μ

*Analysis.*—Calcd. for C₂₇H₃₇O₆F (476.56): C, 68.04; H, 7.83. Found: C, 68.52; H, 7.93.

EXAMPLE 6

*16α,17α-Cyclohexylidene Triamcinolone*

A suspension of 200 mg. of triamcinolone in 15 ml. of redistilled cyclohexanone is treated for two hours as described in Example 5. The resulting cyclohexylidene derivative has the following properties after recrystallization from acetone-hexane: M.P. (after drying at 110° in vacuo) about 278–281°; $[\alpha]_D^{23}+90°$ (c., 1.01 in chloroform);

$\lambda_{max.}^{Nujol}$ 2.87, 3.02, 5.85, 6.02, 6.19, 6.24, 11.24, 11.20μ

EXAMPLE 7

*16α,17α-(3'-Pentylidene) Triamcinolone*

A suspension of 200 mg. of triamcinolone in 30 ml. of diethylketone is treated for four hours as described in Example 5. The resulting isopentylidene derivative has the following properties: M.P. about 265–286°; $[\alpha]_D^{23} +91°$ (c., 0.69 in chloroform);

$\lambda_{max}^{Nujol}$ 3.02, 5.84, 6.01, 6.18, 6.24, 11.18μ

EXAMPLE 8

16α,17α-Ethylidene Triamcinolone

To a suspension of 200 mg. triamcinolone in 15 ml. of freshly distilled paraldehyde is added 0.05 ml. of 72% perchloric acid and the mixture agitated for 3.5 hours at room temperature. The resulting solution is extracted with dilute bicarbonate and water, dried, and the excess paraldehyde removed in vacuo. The residual material represents 16α,17α-ethylidene triamcinolone.

Substitution of 9α-fluoro-Δ$^{1,4}$-pregnadiene-16α,17α-21-triol-3,11,20-trione for triamcinolone in the procedures of Examples 1 through 8, yield the corresponding 11-keto derivatives.

EXAMPLE 9

16α,17α-Isopropylidene 9α-Fluoro-Δ$^4$-Pregnene-11β,16α,17α,21-Tetrol-3,20-Dione A suspension of 200 mg. of 9α-fluoro-Δ$^4$-pregnene-11β,16α,17α,21-tetrol-3,20-dione in 30 ml. of acetone is stirred at room temperature with 100 mg. of p-toluenesulfonic acid monohydrate for 18 hours. The clear solution is neutralized with sodium bicarbonate solution and the acetone evaporated in vacuo. The resulting crystals are filtered and dried in vacuo. Recrystallization from acetone-hexane gives the pure isopropylidene derivative of the following properties: M.P. about 270–273°; $[\alpha]_D^{23} +137°$ (c., 0.45 in chloroform);

$\lambda_{max}^{Nujol}$ 2.90, 5.78, 5.82, 6.01, 6.15μ

Analysis.—Calcd.: $C_{24}H_{33}O_6F$ (436.50): C, 66.03; H, 7.62. Found: C, 66.03; H, 7.92.

Reaction of 9αfluoro-Δ$^4$-pregnene-16α,17α,21-triol-3,11,20-trione with acetone gives the corresponding 11-keto derivative.

EXAMPLE 10

16α,17α-Cyclohexylidene 16α-Hydroxyhydrocortisone

To a suspension of 100 mg. of 16α-hydroxyhydrocortisone in 15 ml. of cyclohexanone is added 0.05 ml. of 72% perchloric acid. The mixture is treated as in Example 5 and results in the formation of the cyclohexylidene derivative of 16α-hydroxyhydrocortisone.

If 16α-hydroxycortisone is substituted for the 16α-hydroxyhydrocortisone in the procedure of Example 10, 16α,17α-cyclohexylidene 16α-hydroxycortisone is obtained.

EXAMPLE 11

16α,17α-Isopropylidene 16α-Hydroxyprednisolone

Treatment of 16α-hydroxyprednisolone with acetone in the presence of perchloric acid according to the procedure of Example 1 results in the formation of 16α,17α-isopropylidene 16α-hydroxyprednisolone.

EXAMPLE 12

16α,17α(3'-Pentylidene) 12α-Chloro-16α-Hydroxycortisone

Treatment of 16α-hydroxy-12α-chlorocortisone with diethylketone as described in Example 7 furnishes the 3'-pentylidene derivative of 16α-hydroxy-12α-chlorocortisone.

EXAMPLE 13

16α,17α-Isopropylidene 16α-Hydroxy-12α-Fluorohydrocortisone

Treatment of 16α-hydroxy-12α-fluorohydrocortisone with acetone in the presence of perchloric acid as described in Example 1 yields the 16α,17α-isopropylidene derivative.

EXAMPLE 14

16α,17α-Isopropylidene 12α-Fluoro-16α-Hydroxyprednisolone

Treatment of 12α-fluoro-16α-hydroxyprednisolone with acetone in the presence of perchloric acid as described in Example 1 yields the 16α,17α-isopropylidene derivative.

EXAMPLE 15

16α,17α-Isopropylidene 12α-Fluoro-Δ$^4$-Pregnene-11β,16α,17α-Triol-3,20-Dione A solution of 30 mg. of 12α-fluoro-Δ$^4$-pregnene-11β,16α,17α-triol-3,20-dione and 0.05 ml. of concentrated hydrochloric acid in 10 ml. of acetone is allowed to remain at room temperature for 18 hours. The resulting mixture when worked up as described in Example 1 furnishes the acetonide derivative which upon recrystallization from 95% alcohol has the following properties: M.P. about 228–230°, $[\alpha]_D^{23} +138°$ (c., 0.40 in CHCl$_3$), $\lambda_{max}^{Nujol}$ 3.01, 5.83, 6.02, 6.17 mμ

By applying the same sequence of reactions to 9α-fluoro-11β,16α,17α-trihydroxyprogesterone the 16α,17α-isopropylidene derivative of 9α-fluoro-Δ$^4$-pregnene-11β,16α,17α-triol-3,20-dione can be prepared.

EXAMPLE 16

16α,17α-Isopropylidene 6α-Methyl-16α-Hydroxyprednisolone

Reaction of 6α-methyl-16α-hydroxyprednisolone with acetone as described in Example 1 yields the isopropylidene derivative of 6α-methyl-16α-hydroxyprednisolone.

EXAMPLE 17

16α,17α-Isopropylidene 6α-Methyl-9α-Fluoro-16α-Hydroxy-Prednisolone

Treatment of 9α-fluoro-6α-methyl-16α-hydroxyprednisolone with acetone and perchloric acid as described in Example 1 furnishes the isopropylidene derivative of the former.

In the same manner the isopropylidene derivative of 9α-fluoro-6α-methyl-16α-hydroxyhydrocortisone can be prepared.

EXAMPLE 18

Acetophenone Derivative of Triamcinolone

To a suspension of 4 g. of triamcinolone in 100 ml. of freshly redistilled acetophenone is added 1.0 ml. of 72% perchloric acid and the mixture stirred at room temperature for two hours, during which period all the triamcinolone has dissolved. The solution is neutralized by the addition of 8 ml. of 1.1 N NaOH and of sufficient aqueous bicarbonate to render it neutral. Water and chloroform is then added and the chloroformacetophenone layer concentrated in high vacuum. The residue is recrystallized from acetone-hexane and the crystals washed well with hexane to remove adhering acetophenone. An analytical sample has the following properties: M.P. about 281–283° (dec.); $[\alpha]_D^{23} +23°$ (c., 0.98 in CHCl$_3$);

$\lambda_{max}^{Nujol}$ 2.91, 5.80, 6.02, 6.16, 6.23, 13.06, 14.29μ.

Analysis.—Calcd. for $C_{29}H_{35}O_6F$ (498.57): C, 69.93; H, 7.07. Found: C, 69.91; H, 7.04.

EXAMPLE 19 p-Nitroacetophenone Derivative of Triamcinolone

To a suspension of 200 mg. of triamcinolone in a mixture of 7 ml. of dioxane and 4 grams of p-nitroacetophenone is added 0.05 ml. of 72% perchloric acid and the mixture stirred at room temperature for 3½ hours. The mixture is then neutralized with dilute sodium bicarbonate solution and the dioxane and excess p-nitroacetophenone removed by vacuum steam distillation. The residual aqueous suspension is extracted with chloroform, the chloroform layer washed with water, dried over sodium sulfate and the solvent removed in vacuo. The remaining derivative is purified by recrystallization from acetone-hexane.

EXAMPLE 20

*Acetophenone Derivative of 9α-Fluoro-Δ⁴-Pregnene 11β,16α,17α,21-Tetrol-3,20-Dione*

A suspension of 200 mg. of 9α-fluoro-Δ⁴-pregnene-11β, 16α,17α,21-tetrol-3,20-dione in 30 ml. of acetophenone is stirred at room temperature with 100 mg. of p-toluenesulfonic acid monohydrate for 18 hours. The clear solution is neutralized with sodium bicarbonate solution and the acetone evaporated in vacuo. The resulting crystals are filtered and dried in vacuo. Recrystallization from acetone-hexane gives the pure acetophenone derivative.

Reaction of 9α-fluoro-Δ⁴-pregnene-16α,17α,21-triol-3,11,20-trione with acetophenone gives the corresponding 11-keto derivative.

EXAMPLE 21

*Benzaldehyde Derivative of 16α-Hydroxyhydrocortisone*

To a suspension of 100 mg. of 16α-hydroxyhydrocortisone in 15 ml. of benzaldehyde is added 0.05 ml. of 72% perchloric acid. The mixture is treated as in Example 18 and results in the formation of the benzaldehyde derivative of 16α-hydroxyhydrocortisone.

If 16α-hydroxycortisone is substituted for the 16α-hydroxyhydrocortisone in the procedure of Example 21 the benzaldehyde 16α-hydroxycortisone is obtained.

EXAMPLE 22

*Furfural Derivative of 16α-Hydroxyprednisolone*

Treatment of 16α-hydroxyprednisolone with furfural in the presence of perchloric acid according to the procedure of Example 18 results in the formation of the furfural derivative of 16α-hydroxyprednisolone.

EXAMPLE 23

*Benzophenone Derivative of 12α-Chloro-16α-Hydroxycortisone*

Treatment of 16α-hydroxy-12α-chlorocortisone with benzophenone as described in Example 18 furnishes the benzophenone derivative of 16α-hydroxy-12α-chlorocortisone.

EXAMPLE 24

*Acetophenone Derivative of 16α-Hydroxy-12α-Fluorohydrocortisone*

Treatment of 16α-hydroxy-12α-fluorohydrocortisone with acetophenone in the presence of perchloric acid as described in Example 18 yields the acetophenone derivative.

EXAMPLE 25

*2-Acetylfuran Derivative of 12α-Fluoro-16α-Hydroxyprednisolone*

Treatment of 12α-fluoro-16α-hydroxyprednisolone with 2-acetylfuran in the presence of perchloric acid as described in Example 18 yields the 2-acetyl-furan derivative.

EXAMPLE 26

*P-Nitroacetophenone Derivative of 12α-Fluoro-Δ⁴-Pregnene-11β,16α,17α-Triol-3,20-Dione*

A solution of 30 mg. of 12α-fluoro-Δ⁴-pregnene-11β,16α,17α-triol-3,20-dione and 0.05 ml. of concentrated hydrochloric acid in 5 ml. of dioxane and 100 mg. of p-nitroacetophenone is allowed to remain at room temperature for 18 hours. The resulting mixture when worked up as described in Example 19 furnishes the p-nitroacetophenone derivative.

By applying the same sequence of reactions to 9α-fluoro-Δ⁴-pregnene-11β,16α,17α-triol-3,20-dione the p-nitroacetophenone derivative of 9α-fluoro-Δ⁴-pregnene-11β,16α,17α-triol-3,20-dione is prepared.

EXAMPLE 27

*Acetophenone Derivative of 6α-Methyl-16α-Hydroxyprednisolone*

Reaction of 6α-methyl-16α-hydroxyprednisolone with acetophenone as described in Example 18 yields the acetophenone derivative of 6α-methyl-16α-hydroxyprednisolone.

EXAMPLE 28

*Acetophenone Derivative of 9α-Fluoro-6α-Methyl-16α-Hydroxyprednisolone*

Treatment of 9α-fluoro-6α-methyl-16α-hydroxyprednisolone with acetophenone and perchloric acid as described in Example 18 furnishes the acetophenone derivative of the former.

In the same manner the acetophenone derivative of 9α-fluoro-6α-methyl-16α-hydroxyhydrocortisone can be prepared.

EXAMPLE 29

*16α,17α-Isopropylidene 9α-Fluoro-11β,16α,17α-Trihydroxyprogesterone*

To a suspension of 272 mg. of 9α-fluoro-Δ⁴-pregnene-11β,16α,17α-triol-3,20-dione in 38 ml. of acetone is added 0.025 ml. of 70% aqueous perchloric acid and the mixture stirred at room temperature for 90 minutes. The mixture is neutralized with dilute sodium bicarbonate solution, the acetone evaporated in vacuo and the resulting suspension filtered. The dry precipitate is recrystallized from acetone-hexane and furnishes the pure acetonide of the following properties: M.P. about 253–255°;

$$[\alpha]_D^{23} + 150°$$

(c., 0.35 in $CHCl_3$);

$\lambda_{max.}^{alc.}$ 238 mμ (ε=17,400); $\lambda_{max.}^{Nujol}$ 3.01, 5.86, 6.05μ.

*Analysis.*—Calcd. for $C_{24}H_{33}O_5F$: (420.50): C, 68.54; H, 7.91. Found: C, 68.72; H, 7.97.

This substance possesses three times the activity of cortisone acetate in the rat liver glycogen assay.

EXAMPLE 30

*16α,17α-Isopropylidene 9α-Chloro-11β,16α,17α-Trihydroxyprogesterone*

Following the procedure of Example 29 but substituting an equivalent amount of 9α-chloro-11β,16α,17α-trihydroxyprogesterone for the 9α-fluoro compound, there is obtained 16α,17α-isopropylidene 9α-chloro-11β,16α,17α-trihydroxyprogesterone.

EXAMPLE 31

*16α,17α-Isopropylidene 9α-Fluoro-Δ⁴-Pregnene-16α,17α-Diol-3,11,20-Trione*

To a stirred solution of 50 mg. of 16α,17α-isopropylidene - 9α - fluoro - Δ⁴ - pregnene - 11β,16α,17α - triol-3,20-dione in 5 ml. of pure acetone is added dropwise 1.2 ml. of a solution of 200 mg. of chromic acid, 320 mg. of sulfuric acid and 1 ml. of water in 9 ml. of acetone. After 30 minutes alcohol is added, the mixture diluted into water and the acetone removed in vacuo. Extraction of the suspension with chloroform and washing of the chloroform extract with water followed by sodium bicarbonate and drying over sodium sulfate yields after evaporation of the solvent the trione which is recrystallized from acetone-hexane.

EXAMPLE 32

*16α,17α-Isopropylidene 9α-Choloro-Δ⁴-Pregnene-16α,17α-Diol-3,11,20-Trione*

Following the procedure of Example 31 but substituting an equivalent amount of 16α,17α-isopropylidene 9α - chloro - Δ⁴ - pregnene - 11β,16α,17α - triol - 3,20-dione for the 9α-fluoro compound, there is obtained 16α, 17α-isopropylidene 9α-chloro-Δ⁴-pregnene-16α,17α-diol-3,11,20-trione.

Furthermore, by substituting 9α-fluoro-Δ¹,⁴-pregnadiene-11β,16α,17α-triol-3,20-dione and 9α-chloro-Δ¹,⁴-pregnadiene-11β,16α,17α-triol-3,20-dione for the starting materials in Examples 29 through 32, the corresponding 1-dehydro derivatives are obtained.

Moreover, if other ketones and aldehydes are substituted for the acetone in the procedure of Examples 29 and 30, the corresponding acetal and ketal derivatives are obtained. Thus methylethylketone yields the corresponding 16α,17α-(2′-butylidene) derivatives; methylisobutylketone yields 16α,17α-(4′-methyl-2′-pentylidene) derivatives; cyclohexanone yields 16α,17α-cyclohexylidenes; diethylketone yields 16α,17α-(3′-pentylidenes); and paraldehyde yields 16α,17α-ethylidenes.

EXAMPLE 33

16α,17α-Chloral Derivative of Triamcinolone

To a suspension of 500 mg. of triamcinolone and 4 grams of chloral hydrate in 20 ml. of dioxane is added 0.1 ml. of 72% perchloric acid and the mixture agitated at room temperature for 24 hours. The mixture is filtered to remove some unreacted triamcinolone neutralized with sodium bicarbonate solution and extracted with chloroform. The chloroform dioxane extract is washed with water, dried over sodium sulfate and the solvents removed in vacuo. The residue represents the chloral derivative of triamcinolone.

EXAMPLE 34

Trifluoroacetonide of Triamcinolone

To a suspension of 300 mg. of triamcinolone in 3 ml. of dioxane and 3 ml. of redistilled 1,1,1-trifluoroacetone is added at 10° 0.03 ml. of 72% perchloric acid. The reaction vessel is closed and the mixture agitated for 2½ hours at room temperature. At the end of this period the mixture is neutralized with dilute sodium bicarbonate solution and extracted with chloroform. The chloroform-dioxane extract is washed with water, dried over sodium sulfate and the solvents removed in vacuo. The residual crystalline material is recrystallized from acetone-hexane.

EXAMPLE 35

16α,17α-Chloral Derivative of 9α-Fluoro-Δ⁴-Pregnene-11β,16α,17α,21-Tetrol-3,20-Dione A suspension of 200 mg. of 9α-fluoro-Δ⁴-pregnene-11β,16α,17α,21-tetrol-3,20-dione and 1.5 g. of chloral hydrate in 8 ml. of acetone is stirred at room temperature with 0.04 ml. of 72% perchloric acid for 18 hours. The clear solution is neutralized with sodium bicarbonate solution and the chloral derivative isolated as described in Example 33.

Reaction of 9α-fluoro-Δ⁴-pregnene-16α,17α-21-triol-3,11,20-trione with chloral hydrate gives the corresponding 11-keto derivative.

EXAMPLE 36

1,1,1-Trifluoroacetonide of 16α-Hydroxyhydrocortisone

To a suspension of 200 mg. of 16α-hydroxyhydrocortisone in 1 ml. dioxane and 1 ml. trifluoroacetone is added 0.05 ml. of 72% perchloric acid. The mixture is treated as in Example 34 and results in the formation of the trifluoroacetonide of 16-hydroxyhydrocortisone.

If 16α-hydroxycortisone is substituted for the 16α-hydroxyhydrocortisone in the procedure of Example 36, 16α-hydroxycortisone trifluoroacetonide is obtained.

EXAMPLE 37

Heptafluorobutanal Derivative of Triamcinolone

To a suspension of 100 mg. of triamcinolone in 5 ml. of heptafluorobutanal ethyl hemiacetal is added 0.05 ml. of 72% perchloric acid, and the mixture stirred at room temperature for two hours. The resulting solution is neutralized with sodium bicarbonate solution and after addition of water, the excess reagent is evaporated in vacuo. The resulting crystals are filtered, washed with water and dried in vacuo.

EXAMPLE 38

16α-Hydroxyprednisolone 1,1,1-Trifluoroacetonide

Treatment of 16α-hydroxyprednisolone with 1,1,1-trifluoroacetone in the presence of perchloric acid according to the procedure of Example 33 results in the formation of 16α-hydroxyprednisolone 1,1,1-trifluoroacetonide.

EXAMPLE 39

16α,17α-Chloral Derivative of 12α-Chloro-16α-Hydroxycortisone

Treatment of the 16α-hydroxy-12α-chlorocortisone with chloral hydrate as described in Example 33 furnishes the chloral derivative of 16α-hydroxy-12α-chlorocortisone.

EXAMPLE 40

16α,17α-Chloral Derivative of 16α-Hydroxy-12α-Fluorohydrocortisone

Treatment of 16α-hydroxy-12α-fluorohydrocortisone with chloral hydrate in the presence of perchloric acid as described in Example 33 yields the 16α,17α-chloral derivative.

EXAMPLE 41

16α,17α-Chloral Derivative of 12α-Fluoro-16α-Hydroxyprednisolone

Treatment of 12α-fluoro-16α-hydroxyprednisolone with chloral hydrate in the presence of perchloric acid as described in Example 33 yields the 16α,17α-chloral derivative.

EXAMPLE 42

16α,17α-Chloral Derivative of 12α-Fluoro-Δ⁴-Pregnene-11β,16α,17α-Triol-3,20-Dione A solution of 30 mg. of 12α-fluoro-Δ⁴-pregnene-11β,16α,17α-triol-3,20-dione, 200 mg. of chloral hydrate, and 0.05 ml. of 72% perchloric acid in 4 ml. of dioxane is allowed to remain at room temperature for 24 hours. The resulting mixture when worked up as described in Example 33 furnishes the chloral derivative.

By applying the same reaction to 9α-fluoro-11β,16α,17α-trihydroxyprogesterone, the 16α,17α-chloral derivative of 9α-fluoro-Δ⁴-pregnene-11β,16α,17α-triol-3,20-dione can be prepared.

EXAMPLE 43

6α-Methyl-16α-Hydroxyprednisolone 1,1,1-Trifluoroacetonide

Reaction of 6α-methyl-16α-hydroxyprednisolone with 1,1,1-trifluoroacetone as described in Example 33 yields the trifluoroacetone derivative of 6α-methyl-16α-hydroxyprednisolone.

EXAMPLE 44

9α-Fluoro-6α-Methyl-16α-Hydroxyprednisolone 1,1,1-Trifluoroacetonide

Treatment of 9α-fluoro-6α-methyl-16α-hydroxyprednisolone with 1,1,1-trifluoroacetone and perchloric acid as described in Example 33 furnishes the trifluoroacetone derivative of the former.

In the same manner the trifluoroacetone derivative of 9α-fluoro-6α-methylhydrocortisone can be prepared.

EXAMPLE 45

16α-17α-Isopropylidene 9α-Methyl-Δ¹,⁴-Pregnadiene-11β,16α,17α,21-Tetrol-3,20-Dione To a suspension of 500 mg. of 16α-hydroxy-9α-methylprednisolone in 75 ml. of acetone is added 0.05 ml. of 72% perchloric acid and the mixture agitated at room temperature for three hours. During this period the crystals gradually dissolve and the clear solution is neutralized with dilute bicarbonate and the acetone removed in vacuo. The resulting crystalline suspension is filtered and the crystals washed with water.

EXAMPLE 46

*16α,17α-Isopropylidene 12α-Methyl-Δ⁴-Pregnene-11β, 16α,17α,21-Tetrol-3,20-Dione*

To a suspension of 500 mg. of 12α-methyl-16α-hydroxyhydrocortisone in 75 ml. of acetone is added 0.05 ml. of concentrated hydrochloric acid and the mixture is stirred at room temperature for 6 hours. It is then treated as described in Example 45 to give the pure product.

EXAMPLE 47

*16α,17α-Isopropylidene 12α-Methyl-Δ¹,⁴-Pregnadiene 11β,16α,17α,21-Tetrol-3,20-Dione*

A suspension containing 100 mg. of 12α-methyl-16α-hydroxyprednisolone and 50 mg. of p-toluene-sulfonic acid in 15 ml. of acetone is stirred for 21 hours at room temperature. The clear solution is worked up as described in Example 45 to give the pure product.

EXAMPLE 48

*16α,17α-(2'-Butylidene) 9α-Methyl-Δ⁴-Pregnene-16α,17α,21-Triol-3,11,20-Trione*

To a suspension of 100 mg. of 9α-methyl-16α-hydroxycortisone in 15 ml. of methylethylketone is added 0.05 ml. of 72% perchloric acid, and the mixture stirred at room temperature for two hours. The resulting solution is neutralized with sodium bicarbonate solution and after addition of water the methylethylketone is evaporated in vacuo. The resulting crystals are filtered, washed with water and dried in vacuo. Recrystallization from acetone-hexane gives the pure isobutylidene derivative.

EXAMPLE 49

*16α,17α-(4'-Methyl-2'-Pentylidene) 12α-Methyl-Δ⁴-Pregnene-11α,16α,17α,21-Tetrol-3,20-Dione*

To a suspension of 100 mg. of 12α-methyl-Δ⁴-pregnene-11α,16α,17α-21-tetrol-3,20-dione in 15 ml. of methylisobutylketone is added 0.05 ml. of 72% perchloric acid. The mixture is stirred at room temperature for 6 hours and the resulting solution extracted with dilute sodium bicarbonate solution, washed with water, the organic phase dried over sodium sulfate and the solvent evaporated in vacuo. Recrystallization of the resulting crystals from acetone-hexane gives the pure isohexylidene derivative.

EXAMPLE 50

*16α,17α-Cyclohexylidene 9α-Methyl-Δ¹,⁴-Pregnadiene-11β,16α,17α,21-Tetrol-3,20-Dione*

A suspension of 200 mg. of 16α-hydroxy-9α-methylprednisolone in 15 ml. of redistilled cyclohexanone is treated for two hours as described in Example 49 to give the resulting cyclohexylidene derivative.

EXAMPLE 51

*16α,17α-(3'-Pentylidene) 12α-Methyl-Δ¹,⁴-Pregnadiene-11β,16α,17α,21-Tetrol-3,20-Dione*

A suspension of 200 mg. of 16α-hydroxy-12α-methylprednisolone in 30 ml. of diethylketone is treated for four hours as described in Example 49 to give the isopentylidene derivative.

EXAMPLE 52

*16α,17α-Ethylidene 9α-Methyl-Δ¹,⁴-Pregnadiene-11β, 16α,17α,21-Tetrol-3,20-Dione*

To a suspension of 200 mg. 9α-methyl-16α-hydroxyprednisolone in 15 ml. of freshly distilled paraldehyde is added 0.05 ml. of 72% perchloric acid and the mixture agitated for 3.5 hours at room temperature. The resulting solution is extracted with dilute bicarbonate and water, dried, and the excess paraldehyde removed in vacuo. The residual material represents the 16α,17α-ethylidene derivative.

EXAMPLE 53

*16α,17α-Chloral Derivative of 9α-Methyl-Δ⁴-Pregnene-11β,16α,17α,21-Tetrol-3,20-Dione*

To a suspension of 500 mg. of 9α-methyl-Δ⁴-pregnene-11β,16α,17α,21-tetrol-3,20-dione and 4 grams of chloral hydrate in 20 ml. of dioxane is added 0.1 ml. of 72% perchloric acid and the mixture agitated at room temperature for 24 hours. The mixture is filtered to remove some unreacted steroid, neutralized with sodium bicarbonate solution and extracted with chloroform. The chloroform-dioxane extract is washed with water, dried over sodium sulfate and the solvents removed in vacuo. The residue represents the chloral derivative of 9α-methyl-16α-hydroxyhydrocortisone.

EXAMPLE 54

*16α,17α-Cyclohexylidene 9 -Methyl-16α-Hydroxyhydrocortisone*

To a suspension of 100 mg. of 9α-methyl-16α-hydroxyhydrocortisone in 15 ml. of cyclohexanone is added 0.05 ml. of 72% perchloric acid. The mixture is treated as in Exanmple 49 and results in the formation of the cyclohexylidene derivative of 9α-methyl-16α-hydroxyhydrocortisone.

If 9α-methyl-16α-hydroxycortisone is substituted for the 9α-methyl-16α-hydroxyhydrocortisone in the procedure of Example 54, 16α,17α-cyclohexylidene 9α-methyl-16α-hydroxycortisone is obtained.

EXAMPLE 55

*16α,17α-Isopropylidene 12α-Methyl-Δ⁴-Pregnene-11β, 16α,17α-Triol-3,20-Dione*

A solution of 30 mg. of 12α-methyl-Δ⁴-pregnene-11β, 16α,17α-triol-3,20-dione and 0.05 ml. of concentrated hydrochloric acid in 10 ml. of acetone is allowed to remain at room temperature for 18 hours. The resulting mixture when worked up as described in Example 45 furnishes the acetonide derivative.

By applying the same sequence of reactions to 9α-methyl-11β,16α,17α-trihydroxyprogesterone the 16α,17α-isopropylidene derivative of 9α-methyl-Δ⁴-pregnene-11β,16α, 17α-triol-3,20-dione can be prepared.

EXAMPLE 56

*Acetophenone Derivative of 9α-Methyl-Δ¹,⁴-Pregnadiene 11β,16α,17α,21-Tetrol-3,20-Dione*

To a suspension of 4 g. of 16α-hydroxy-9α-methylprednisolone in 100 ml. of freshly redistilled acetophenone is added 1.0 ml. of 72% perchloric acid and the mixture stirred at room temperature for two hours, during which period all the triamcinolone has dissolved. The solution is neutralized by the addition of 8 ml. of 1.1 N NaOH and of sufficient aqueous bicarbonate to render it neutral. Water and chloroform is then added and the chloroform-acetophenone layer concentrated in high vacuum. The residue is recrystallized from acetone-hexane and the crystals washed well with hexane to remove adhering acetophenone to yield the pure acetophenone derivative.

EXAMPLE 57

*Acetophenone Derivative of 9α-Methyl-16α-Hydroxyprednisolone 21-Acetate*

A solution of 50 mg. of the acetophenone derivative of 9α-methyl-16α-hydroxyprednisolone in 1 ml. of pyridine and 1 ml. of acetic anhydride is allowed to stand at room temperature for 18 hours. Removal of the reagents in vacuo gives a crystalline residue which after crystallization from acetone-hexane gives the pure acetate.

Substitution of 9α-methyl-$\Delta^{1,4}$-pregnadiene-16α,17α,21-triol-3,11,20-trione for the 11β-hydroxy derivative in the procedures of Examples 56 and 57, yield the corresponding 11-keto derivatives.

EXAMPLE 58

*Acetophenone Derivative of 9α-Methyl-$\Delta^4$-Pregnene 11β,16α,17α,21-Tetrol-3,20-Dione*

A suspension of 200 mg. of 9α-methyl-$\Delta^4$-pregnene-11β,16α,17α,21-tetrol-3,20-dione in 30 ml. of acetophenone is stirred at room temperature with 100 mg. of p-toluenesulfonic acid monohydrate for 18 hours. The clear solution is neutralized with sodium bicarbonate solution and the acetone evaporated in vacuo. The resulting crystals are filtered and dried in vacuo. Recrystallization from acetone-hexane gives the pure acetophenone derivative.

Reaction of 9α-methyl-$\Delta^4$-pregnene,16α,17α,21-triol-3,11,20-trione with acetophenone gives the corresponding 11-keto derivatives.

EXAMPLE 59

*Benzaldehyde Derivative of 9α-Methyl-16α-Hydroxyhydrocortisone*

To a suspension of 100 mg. of 9α-methyl-16α-hydroxyhydrocortisone in 15 ml. of benzaldehyde is added 0.05 ml. of 72% perchloric acid. The mixture is treated as in Example 56 and results in the formation of the benzaldehyde derivative of 9α-methyl-16α-hydroxyhydrocortisone.

If 9α-methyl-16α-hydroxycortisone is substituted for the 9α-methyl-16α-hydroxyhydrocortisone in the procedure of Example 59, the benzaldehyde 9α-methyl-16α-hydroxycortisone is obtained.

EXAMPLE 60

*Furfural Derivative of 12α-Methyl-16α-Hydroxyprednisolone*

Treatment of 12α-methyl-16α-hydroxyprednisolone with furfural in the presence of perchloric acid according to the procedure of Example 56 results in the formation of the furfural derivative of 12α-methyl-16α-hydroxyprednisolone.

EXAMPLE 61

*Benzophenone Derivative of 12α-Methyl-16α-Hydroxycortisone*

Treatment of 16α-hydroxy-12α-methylcortisone with benzophenone as described in Example 56 furnishes the benzophenone derivative of 16α-hydroxy-12α-methylcortisone.

EXAMPLE 62

*2-Acetylfuran Derivative of 12α-Methyl-16α-Hydroxyprednisolone*

Treatment of 12α-methyl-16α-hydroxyprednisolone with 2-acetylfuran in the presence of perchloric acid as described in Example 56 yields the 2-acetylfuran derivative.

EXAMPLE 63

*Ethyl Levulinate Derivative of Triamcinolone*

To a suspension of 400 mg. of triamcinolone in 10 ml. of redistilled ethyl levulinate is added 0.05 ml. of 72% perchloric acid and the mixture stirred at room temperature for one hour and 15 minutes, complete dissolution of triamcinolone occurring after 50 minutes. The mixture is neutralized with dilute sodium bicarbonate solution and distributed between chloroform and water. The chloroform layer is washed with water, dried over sodium sulfate and concentrated in high vacuum to remove chloroform and excess ethyl levulinate. The crystalline residue after purification by crystallization from acetone-hexane has the following properties: M.P. about 196–198°; $[\alpha]_D^{23}+75°$ (c., 1.11 in CHCl$_3$);

$\lambda_{max}^{Nujol}$ 2.85, 3.00, 5.80, 6.01, 6.18, 6.24μ.

*Analysis.*—Calcd. for C$_{28}$H$_{37}$O$_8$F (520.57): C, 64.59; H, 7.16. Found: C, 64.54; H, 7.15.

By substituting ethyl acetoacetate or ethyl pyruvate for the ethyl levulinate in Example 63, the corresponding derivatives are formed.

EXAMPLE 64

*Levulinic Acid Derivative of Triamcinolone*

To a solution of 200 mg. of the ethyl levulinate derivative of triamcinolone in 24 ml. of methanol, which has been evacuated several times and kept under nitrogen is added 1 ml. of oxygen-free 10% potassium carbonate solution. The solution is allowed to remain at room temperature for 24 hours, after which time it is acidified with dilute sulfuric acid. Water is added and the methanol removed in vacuo. The resulting suspension is extracted with chloroform and the chloroform extract washed with three 2 ml. portions of sodium bicarbonate solution. The sodium bicarbonate extract containing the levulinic acid derivative is acidified with dilute sulfuric acid and extracted with chloroform. The chloroform extract is dried over sodium sulfate and the solvent removed in vacuo. The residual crystalline material after recrystallization from methanol has the following properties: M.P. about 240–242° (dec.); $[\alpha]_D^{23}+51°$ (c., 0.56 in CHCl$_3$);

$\lambda_{max}^{alc.}$ 2.38 mμ (ε=15,500); $\lambda_{max}^{Nujol}$ 2.85, 2.95, 3.00, 5.75 5.88, 6.04, 6.29μ.

*Analysis.*—Calcd. for C$_{26}$H$_{33}$O$_8$F·H$_2$O (510.54): C, 61.15; H, 7.12. Found: C, 61.23; H, 7.12.

Similarly, by substituting the ethyl acetoacetate and ethyl pyruvate derivatives of triamcinolone for the ethyl levulinate derivative in the procedure of Example 64, the acetoacetic acid and pyruvic acid derivatives of triamcinolone are formed, respectively.

EXAMPLE 65

*Sodium Levulinate Derivative of Triamcinolone*

A solution of 50 mg. of the levulinic acid derivative of triamcinolone in 5 ml. of alcohol is neutralized by dropwise addition of 0.1 N sodium hydroxide. The neutral solution is freed from alcohol in vacuo, water is added and the resulting solution lyophilized. The sodium salt of the levulinic acid derivative of triamcinolone is obtained as a white powder.

EXAMPLE 66

*Methyl Glyoxylate Derivative of Triamcinolone*

Following the procedure of Example 63, but substituting methyl glyoxylate for the ethyl levulinate, there is obtained the methylglyoxylate derivative of triamcinolone.

Substitution of 9α-fluoro-$\Delta^{1,4}$-pregnadiene-16α,17α,21-triol-3,11,20-trione for triamcinolone in the procedures of Examples 63 through 66 yield the corresponding 11-keto derivatives.

EXAMPLE 67

*Ethyl Levulinate Derivatives of 9α-Fluoro-$\Delta^4$-Pregnene-11β,16α,17α,21-Tetrol-3,20-Dione*

Following the procedure of Example 63 but substituting 400 mg. of 9α-fluoro-$\Delta^4$-pregnene-11β,16α,17α,21-tetrol-3,20-dione for the triamcinolone, there is obtained the ethyl levulinate derivative of 9α-fluoro-$\Delta^4$-pregnene-11β,16α,17α,21-tetrol-3,20-dione.

Reaction of 9α-fluoro-$\Delta^4$-pregnene-16α,17α,21-triol-3,11,20-trione with ethyl levulinate gives the corresponding 11-keto derivatives.

EXAMPLE 68

*Ethyl Acetoacetate Derivative of 16α-Hydroxyhydrocortisone*

To a suspension of 100 mg. of 16α-hydroxyhydrocortisone in 15 ml. of ethyl acetoacetate is added 0.05 ml. of 72% perchloric acid. The mixture is treated as in Example 63 and results in the formation of the ethyl acetoacetate derivative of 16α-hydroxyhydrocortisone.

If 16α-hydroxycortisone is substituted for the 16α-hydroxyhydrocortisone in the procedure of Example 68, the corresponding 11-keto derivative is formed.

EXAMPLE 69

*Ethyl Levulinate Derivative of 16α-Hydroxyprednisolone*

Treatment of 16α-hydroxyprednisolone with ethyl levulinate in the presence of perchloric acid according to the procedure of Example 63 results in the formation of the ethyl levulinate derivative 16α-hydroxyprednisolone.

EXAMPLE 70

*Ethyl Levulinate Derivative of 12α-Chloro-16α-Hydroxycortisone*

Treatment of the 16α-hydroxy-12α-chlorocortisone with ethyl levulinate as described in Example 63 furnishes the ethyl levulinate derivative of 16α-hydroxy-12α-chlorocortisone.

EXAMPLE 71

*Ethyl Levulinate Derivative of 16α-Hydroxy-12α-Fluorohydrocortisone*

Treatment of 16α-hydroxy-12α-fluorohydrocortisone with ethyl levulinate in the presence of perchloric acid as described in Example 63 yields the ethyl levulinate derivative.

EXAMPLE 72

*Ethyl Levulinate Derivative of 12α-Fluoro-16α-Hydroxyprednisolone*

Treatment of 12α-fluoro-16α-hydroxyprednisolone with ethyl levulinate in the presence of perchloric acid as described in Example 63 yields the ethyl levulinate derivative.

EXAMPLE 73

*Ethyl Pyruvate Derivative of 12α-Fluoro-Δ$^4$-Pregnene-11β,16α,17α-Triol-3,20-Dione*

A solution of 30 mg. of 12α-fluoro-Δ$^4$-pregnene-11β,16α,17α-triol-3,20-dione and 0.05 ml. of concentrated hydrochloric acid in 10 ml. of ethyl pyruvate is allowed to remain at room temperature for 18 hours. The resulting mixture when worked up as described in Example 63 furnishes the ethyl pyruvate derivative.

By applying the same sequence of reactions to 9α-fluoro-11β,16α,17α-trihydroxyprogesterone the ethyl pyruvate derivative of 9α-fluoro-Δ$^4$-pregnene-11β,16α,17α-triol-3,20-dione can be prepared.

EXAMPLE 74

*Ethyl Levulinate Derivative of 6α-Methyl-16α-Hydroxyprednisolone*

Reaction of 6α-methyl-16α-hydroxyprednisolone with ethyl levulinate as described in Example 63 yields the ethyl levulinate derivative of 6α-methyl-16α-hydroxyprednisolone.

EXAMPLE 75

*Ethyl Levulinate Derivative of 9α-Fluoro-6α-Methyl-16α-Hydroxyprednisolone*

Treatment of 9α-fluoro-6α-methyl-16α-hydroxyprednisolone with ethyl levulinate and perchloric acid as described in Example 63 furnishes the ethyl levulinate derivative of the former.

In the same manner the ethyl levulinate derivative of 9α-fluoro-6α-methyl-16α-hydroxyhydrocortisone can be prepared.

The following examples are illustrative of the preparation of these compounds of this invention wherein an ester is present in the 21-position (Z is halogen or acyloxy). All temperatures given in the examples are in centigrade:

EXAMPLE 76

*16α,17α-Isopropylidene Triamcinolone 21-Acetate*

A solution of 50 mg. of triamcinolone acetonide in 1 ml. of pyridine and 1 ml. of acetic anhydride is allowed to stand at room temperature for 18 hours. Removal of the reagents in vacuo gives a crystalline residue which after crystallization from acetone-hexane gives pure acetate of the following properties: M.P. about 266°; $[\alpha]_D^{23}+92°$ (c., 0.59 in CHCl$_3$);

$\lambda_{max.}^{alc.}$ 238 mµ (ε=16,100); $\lambda_{max.}^{Nujol}$ 3.01, 5.71, 5.79, 6.01–6.04, 6.21–6.24µ.

*Analysis.*—Calcd. for: C$_{26}$H$_{33}$O$_7$F (476.52): C, 65.52; H, 6.98. Found: C, 65.49; H, 6.81.

EXAMPLE 77

*Acetophenone Derivative of Triamcinolone 21-Acetate*

A solution of 50 mg. of the acetophenone derivative of triamcinolone in 1 ml. of pyridine and 1 ml. of acetic anhydride is allowed to stand at room temperature for 18 hours. Removal of the reagents in vacuo gives a crystalline residue which after crystallization from acetone-hexane gives the pure acetate.

EXAMPLE 78

*16α,17α-Chloral Derivative of Triamcinolone 21-Monoacetate*

A solution of 570 mg. of 16α,17α-chloral derivative of triamcinolone in 10 ml. of anhydrous pyridine and 20 ml. of acetic anhydride is allowed to remain at room temperature for 18 hours. The reagents are removed in vacuo, the dried residue dissolved in 40 ml. of benzene and chromatographed on 12 grams of acid-washed alumina. Elution with 1 l. each of benzene, 5% chloroform in benzene, and 10% chloroform in benzene yields the pure chloral derivative of triamcinolone 21-monoacetate of the following properties: M.P. about 281–284° (dec); $[\alpha]_D^{23}+36°$ (c., 1.0 in CHCl$_3$);

$\lambda_{max.}^{alc.}$ 237 mµ (ε=19,800); $\lambda_{max.}^{Nujol}$ 2.85, 3.00, 5.69, 5.78, 6.02, 6.18, 6.22µ.

EXAMPLE 79

*16α,17α-Chloral Derivative of Triamcinolone 21-Hemisuccinic Acid*

A solution of 500 mg. of the 16α,17α-chloral derivative of triamcinolone and 1 gram of succinic anhydride in 5 ml. of anhydrous pyridine is heated at 60–70° for 2 hours. After cooling to 15°, 2 grams of ice is added and the mixture poured slowly with stirring onto 20 ml. of crushed ice containing 2 ml. of concentrated sulfuric acid. The resulting precipitate of the 16,17-chloral derivative of triamcinolone 21-hemisuccinic acid is filtered and washed well with water until free from sulfuric acid. The dried material is crystallized from 25% alcohol.

EXAMPLE 80

*16α,17α-Chloral Derivative of 9α-Methyl-Δ$^4$-Pregnene-11β,16α,17α,21-Tetrol-3,20-Dione 21-Acetate*

A solution of 570 mg. of the chloral derivative of 9α-methyl-16α-hydroxyhydrocortisone in 10 ml. of anhydrous pyridine and 20 ml. of acetic anhydride is allowed to remain at room temperature for 18 hours. The reagents are removed in vacuo, the dried residue dissolved in 40 ml. of benzene and chromatographed on 12 grams of acid-washed alumina. Elution with 1 l. each of benzene, 5% chloroform in benzene, and 10% chloroform in benzene yields the pure chloral derivative of 9α-methyl-Δ⁴-pregnene-11β,16α,17α,21-tetrol-3,20-dione 21-acetate.

EXAMPLE 81

*16α,17α-Isopropylidene 12α-Methyl-Δ⁴-Pregnene-11β,16α,17α,21-Tetrol-3,20-Dione 21-Acetate*

A solution of 50 mg. of 12α-methyl-16α-hydroxydrocortisone 16α,17α-acetonide in 1 ml. of pyridine and 1 ml. of acetic anhydride is allowed to stand at room temperature for 18 hours. Removal of the reagents in vacuo gives a crystalline residue which after crystallization from acetone-hexane gives the pure acetate.

EXAMPLE 82

*Ethyl Levulinate Acid Derivative of Triamcinolone 21-Acetate*

A solution of 50 mg. of the ethyl levulinate derivative of triamcinolone in 1 ml. of pyridine and 1 ml. of acetic anhydride is allowed to stand at room temperature for 18 hours. Removal of the reagents in vacuo gives a crystalline residue which after crystallization from acetone-hexane yields the pure acetate.

EXAMPLE 83

*Triamcinolone Acetonide 21-Sodium Hemisuccinate*

(a) Preparation of triamcinolone acetonide 21-hemisuccinic acid: A solution of 4 g. of triamcinolone 16α,17α-acetonide and 8 g. of succinic anhydride in 40 ml. of anhydrous pyridine is heated at 60–70° for 2 hours. After cooling to 15°, 20 g. of ice is added and the mixture poured slowly with stirring onto 150 ml. of crushed ice, containing 16 ml. of concentrated sulfuric acid. The resulting precipitate of triamcinolone acetonide 21-succinic acid is filtered and washed well with water until free from sulfuric acid. The dried material (about 4.5 g.) is crystallized from 95% alcohol with the aid of carbon which yields the pure acid of the following properties: M.P. about 231–233° $[\alpha]_D^{23} +93°$ (c., 0.39 in $CHCl_3$);

$\lambda_{max}^{Nujol}$ 2.94, 5.71, 5.79, 6.02, 6.17, 6.26μ

(b) Preparation of triamcinolone acetonide 21-sodium hemisuccinate: 500 mg. of triamcinolone acetonide 21-hemisuccinic acid is dissolved in a minimum of 95% alcohol and the resulting solution is neutralized with 0.1 N sodium hydroxide solution. The neutralized solution is freed from alcohol in vacuo, extracted with chloroform to remove residual unneutralized acid and the aqueous solution lyophilized in high vacuum. The residual white powder represents the pure sodium salt.

EXAMPLE 84

*Triamcinolone Acetonide 21-Sodium o-Hemiphthalate*

Following the procedure of Example 83, but substituting 10 g. of phthalic anhydride for the succinic anhydride in part a, there is obtained triamcinolone acetonide 21-sodium o-hemiphthalate.

EXAMPLE 85

*16α-17α-(2′-Butylidene) Triamcinolone 21-Sodium Hemisuccinate*

Following the procedure of Example 83, but substituting 4 g. of 16α,17α-(2′-butylidene)triamcinolone for the triamcinolone acetonide, there is obtained 16α,17α-(2′-butylidene)triamcinolone 21-sodium hemisuccinate.

EXAMPLE 86

*12α-Fluoro-16α-Hydroxyprednisolone Acetonide 21-Sodium Hemisuccinate*

Following the procedure of Example 83, but substituting 4 g. of 12α-fluoro-16α-hydroxyprednisolone acetonide for the triamcinolone acetonide, there is obtained 12α-fluoro-16α-hydroxyprednisolone acetonide 21-sodium hemisuccinate.

EXAMPLE 87

*16α-17α-Ethylidene Triamcinolone 21-Sodium Hemisuccinate*

Following the procedure of Example 83, but substituting 4 g. of 16α,17α-ethylidene triamcinolone for the triamcinolone acetonide, there is obtained 16α,17α-ethylidene triamcinolone 21-sodium hemisuccinate.

Similarly,

16α,17α-cyclohexylidene triamcinolone,
16α,17α-(3′-pentylidene) triamcinolone,
9α-fluoro-16α-hydroxyhydrocortisone acetonide,
16α-hydroxyprednisolone acetonide,
16α,17α-(3′-pentylidene) 12α-chloro-16α-hydroxycortisone,
12α-fluoro-16α-hydroxyhydrocortisone acetonide,
12α-chloro-16α-hydroxyprednisolone acetonide,
6α-methyl-16α-hydroxyprednisolone acetonide,
and 9α-fluoro-6α-methyl-16α-hydroxyprednisolone acetonide yield their respective 21-sodium hemisuccinate derivatives.

EXAMPLE 88

*Triamcinolone Acetophenone 21-Sodium Hemisuccinate*

Following the procedure of Example 83, but substituting 4 g. of triamcinolone acetophenone for the triamcinolone acetonide, there is obtained triamcinolone acetophenone 21-sodium hemisuccinate.

Similarly, the acetophenone derivative of 9α-fluoro-16α-hydroxyhydrocortisone 16α,17α-benzylidene 16α-hydroxyhydrocortisone, 16,17 furfurylidene 16α-hydroxyprednisolone, the benzophenone derivative of 12α-chloro-16α-hydroxycortisone, the acetophenone derivative of 16α-hydroxy-12α-fluorohydrocortisone, 16α,17α - acetylfurylidene 12α-fluoro - 16α - hydroxyprednisolone, the acetophenone derivative of 6α-methyl-16α-hydroxyprednisolone, the acetophenone derivative of 9α-fluoro-6α-methyl-16α-hydroxyprednisolone, and the p-nitroacetophenone derivative of triamcinolone yield the corresponding 21-sodium hemisuccinate derivative.

EXAMPLE 89

*Traimcinolone Acetonide 21-Potassium Hemiglutarate*

Following the procedure of Example 83, but substituting 9 g. of glutaric anhydride for the succinic anhydride in part a and 0.1 N aqueous potassium hydroxide for the sodium hydroxy in part b, there is obtained triamcinolone acetonide 21-potassium hemiglutarate.

EXAMPLE 90

*Triamcinolone Acetonide 21-Mesylate*

To a solution of 1 g. of triamcinolone acetonide in 10 ml. of anhydrous pyridine is added at 0° 1 ml. of methanesulfonyl chloride. After two hours at 0° ice water is added and the precipitated mesylate is removed by filtration. The precipitate is washed thoroughly with water and dried in vacuo, and recrystallized from acetone-hexane. The pure mesylate has the following properties: M.P. about 248–250° (dec.) or 286–287° (dec.) (polymorphic forms); $[\alpha]_D^{23} +92°$ (c., 1.12 in $CHCl_3$).

*Analysis.*—Calcd. for $C_{24}H_{31}O_8SF$ (498.55); C, 57.81; H, 6.27; F, 3.81; S, 6.43. Found: C, 57.87; H, 6.20; F, 3.83; S, 6.33.

Similarly, by substituting aryl sulfonyl chlorides or other lower alkanesulfonyl chlorides for the methane sulfonyl chloride in the procedure of Example 90, the corresponding 21-arylsulfonyloxy and 21-alkanesulfonyloxy derivatives are formed. Thus, p-toluenesulfonyl chloride, ethanesulfonyl chloride and propanesulfonyl chloride yield triamcinolone acetonide 21-p-toluenesulfonate, triamcinolone acetonide 21-ethanesulfonate and triamcinolone acetonide 21-propanesulfonate, respectively.

EXAMPLE 91

*16α-Hydroxy-9α-Fluorohydrocortisone Acetonide 21-Mesylate*

To a solution of 1.5 g. of 16α-hydroxy-9α-fluorohydrocortisone acetonide in 15 ml. of dry pyridine is added at 0°, 1.5 ml. of methanesulfonyl chloride. After standing in the refrigerator for 2½ hours, excess methanesulfonyl chloride is destroyed by the addition of a small amount of ice, after which ice-water is added slowly to precipitate the reaction product. After ½ hour in the refrigerator the material is filtered off, washed thoroughly with water and dried in vacuo. The resulting crude material after recrystallization from acetone-hexane gives the pure 21-mesylate of the following properties: M.P. about 225–227° (dec.); $[\alpha]_D^{23} + 112°$ (c., 0.5 in chlf.);

$\lambda_{max.}^{Nujol}$ 2.86; 2.94; 5.76; 5.90; 5.96; 6.14μ.

*Analysis.*—Calcd. for $C_{25}H_{35}O_8FS$ (500.56): C, 58.35; H, 6.85; S, 6.23. Found: C, 58.18; H, 6.82; S, 6.05.

Similarly, but substituting other 16α,17α-acetals or ketals for the triamcinolone acetonide in Example 90 or the 9α-fluoro-16α-hydroxyhydrocortisone acetonide in Example 91, the corresponding 21-mesylates are formed. Thus, the acetophenone derivatives of triamcinolone, 16α,17α-(2′-butylidene) triamcinolone,
16α,17α-(4′-methyl-2′-pentylidene)triamcinolone,
16α,17α-ethylidene triamcinolone,
16α,17α-cyclohexylidene triamcinolone,
16α,17α-(3′-pentylidene)triamcinolone,
16α-hydroxyprednisolone acetonide,
16α,17α-(3′-pentylidene)-12α-chloro-16α-hydroxycortisone,
12α-fluoro-16α-hydroxyhydrocortisone acetonide,
12α-fluoro-16α-hydroxyprednisolone acetonide,
6α-methyl-16α-hydroxyprednisolone acetonide,
9α-fluoro-6α-methyl-16α-hydroxyprednisolone acetonide, the acetophenone derivative of 9α-fluoro-16α-hydroxyhydrocortisone,
16α,17α-benzylidene-16α-hydroxyhydrocortisone,
16α,17α-furfurylidene-16α-hydroxyprednisolone, the benzophenone derivative of 12α-chloro-16α-hydroxycortisone, the acetophenone derivative of 16α-hydroxy-12α-fluorohydrocortisone,
16α,17α-2-acetylfurylidene-12α-fluoro-16α-hydroxyprednisolone, the acetophenone derivative of 6α-methyl-16α-hydroxyprednisolone, the acetophenone derivative of 9α-fluoro-6α-methyl-16α-hydroxyprednisolone and the p-nitracetophenone derivative of triamcinolone yield their respective 21-mesylate derivatives.

EXAMPLE 92

*21-Iodo-9α-Fluoro-Δ¹,⁴-Prednadiene-11β-16α,17α-Triol-3,20-Dione 16α,17α-Acetonide*

A solution of 500 mg. of triamcinolone acetonide 21-mesylate and 1.5 g. of sodium iodide in 15 ml. of acetone is refluxed for 40 hours. The reaction mixture is then diluted with water and the crystals filtered off and dried in vacuo. After recrystallization from acetone-hexane, pure 21-iodo-21-desoxytriamcinolone acetonide has the following properties: M.P. about 176–178° (dec.); $[\alpha]_D^{23} + 13°$ (c., 1.12 in ChCl₃).

*Analysis.*—Calcd. for $C_{24}H_{30}O_5FI$ (544.40) C, 52.94; H, 5.55; I, 23.31. Found: C, 52.31; H, 6.02; I, 22.69.

EXAMPLE 93

*21-Iodo-9α-Fluoro-Δ⁴-Pregnene-11β,16α,17α-Triol-3,20-Dione 16α,17α-Acetonide*

A solution of 250 mg. of 9α-fluoro-16α-hydroxyhydrocortisone 16α,17α-acetonide 21-mesylate and 750 mg. of sodium iodide in 7 ml. of acetone is refluxed for 40 hours, the resulting reaction mixture diluted with water and the resulting crystals filtered, washed well with water and dried in vacuo. Recrystallization of the crude product from acetone-hexane furnishes the pure iodo compound possessing the following properties: M.P. about 173–175° (dec.); $[\alpha]_D^{23} + 130°$ (c., 0.52 in chloroform);

$\lambda_{max.}^{Nujol}$ 2.95, 5.80, 5.86, 6.05, 6.20μ.

Similarly, but substituting the 21-mesylates of other 16α,17α-acetals or ketals for the triamcinolone acetonide 21-mesylate in Example 92 or the 9α-fluoro-16α-hydroxyhydrocortisone acetonide 21-mesylate in Example 93, the corresponding 21-iodo derivatives are formed.

EXAMPLE 94

*16α,17α-Isopropylidene 9α,21-Difluoro-Δ¹,⁴-Pregnadiene-11β,16α,17α-Triol-3,20-Dione*

A mixture containing 1 gm. of triamcinolone acetonide 21-mesylate, 1 gm. of KF and 25 ml. of ethylene glycol is refluxed (180°) for 19 hours. The dark solution is poured into ice-water, extracted with chloroform and the chloroform extract washed with water, dried over sodium sulfate and evaporated to dryness in vacuo. The residue is recrystallized from acetone with the aid of charcoal. The pure fluoride after three crystallizations has the following properties: M.P. about 310°;

$\lambda_{max.}^{Nujol}$ 3.02, 5.78, 6.03, 6.20, 6.20μ.

*Analysis.*—Calcd. for $C_{24}H_{30}O_5F_2$ (436.48); C, 66.04; H, 6.93; F, 8.59. Found: C, 65.64; H, 6.93; F, 7.81.

This compound possesses about 29 times the activity of cortisone in the rat liver glycogen assay and about 20 times the activity of hydrocortisone in the rat anti-inflammatory assay.

EXAMPLE 95

*21-Chloro-9α-Fluoro-Δ¹,⁴-Pregnadiene-11β,16α,17α-Triol-3,20-Dione 16,17-Acetonide*

A solution of 200 mg. of triamcinolone acetonide 21-mesylate and 900 mg. of lithium chloride in 25 ml. of dimethyl formamide is kept at 100° for 24 hours. The mixture is poured on ice, extracted with chloroform and the choloroform extract washed with water and dried over sodium sulfate. Evaporation of the solvent in vacuo furnishes the crystalline chloride, which after recrystallization from acetone-ethanol has the following properties: M.P. about 310°.

*Analysis.*—Calcd. for $C_{24}H_{32}O_5FCl$ (454.96): C, 63.35; H, 7.09; Cl, 7.99. Found: C, 63.31; H, 6.83; Cl, 7.92.

When the lithium chloride in the above reaction is replaced by lithium bromide and the reaction is shortened to 12 hours there is obtained the corresponding 21-bromo derivative.

Similarly, by substituting the 21-mesylates of the acetophenone derivative of triamcinolone, 16α,17α-(2′-butylidene) triamcinolone,
16α,17α-(4′-methyl-2′-pentylidene) triamcinolone,
16α,17α-ethylidene triamcinolone,
16α,17α-cyclohexylidene triamcinolone,
16α,17α-(3′-pentylidene) triamcinolone,
16α-hydroxy-9α-fluorohydrocortisone acetonide,
16α-hydroxy-prednisolone acetonide,
16α,17α-(3′-pentylidene)12α-chloro-16α-hydroxycortisone,
12α-fluoro-16α-hydroxyhydrocortisone acetonide,
12α-fluoro-16α-hydroxyprednisolone acetonide,
6α-methyl-16α-hydroxyprednisolone acetonide,
9α-fluoro-6α-methyl-16α-hydroxyprednisolone acetonide, the acetophenone derivatives of 9α-fluoro-16α-hydroxyhydrocortisone,
16α,17α-benzylidene 16α-hydroxyhydrocortisone,
16α,17α-furfurylidene 16α-hydroxyprednisolone, the benzophenone derivative of 12α-chloro-16α-hydroxycortisone, the acetophenone derivative of 16α-hydroxy- 12α-fluorohydrocortisone, 16α,17α-2-acetylfurylidene 12α-fluoro-16α-hydroxyprednisolone, and the acetophenone derivative of 9α-fluoro-6α-methyl-16α-hydroxyprednisolone for the triamcinolone acetonide 21-mesylate in Examples 94 and 95, the respective 21-fluoro and 21-chloro derivatives are obtained.

EXAMPLE 96

*Bis-(Triamcinolone 16α,17α-Acetonide) 21,21'-Sulfite*

To a solution of 200 mg. of triamcinolone 16α,17α-acetonide in 6 ml. of anhydrous pyridine is added at −15° with stirring 0.2 ml. of thionyl chloride. The reaction is allowed to proceed for 2½ minutes at −15° after which time ice water is added. The mixture is taken up in chloroform and the resulting chloroform extract washed with water, 1 N sulfuric acid, water, dilute sodium bicarbonate and again with water. The solution is dried over sodium sulfate and evaporated to dryness in vacuo. The crystalline residue (about 200 mg.) is dissolved in 20 ml. of warm chloroform and chromatographed on 4 g. of neutral alumina. Chloroform (100 ml.) elutes about 120 mg. of crystalline material, which after recrystallization from acetone furnishes about 80 mg. of the pure 21,21'-sulfite derivative having the following properties: M.P. about 285–286° (dec.); $[\alpha]_D^{23}$ +114° (c., 0.53 in chloroform);

$\lambda_{max.}^{Nujol}$ 2.91, 5.80, 6.04, 6.19, 6.22 (shoulder), and 8.30μ.

*Analysis.*—Calcd. for $C_{48}H_{60}O_{13}F_2S$ (915.02): C, 63.00; H, 6.61; S, 3.50. Found: C, 62.71; H, 6.72; S, 3.80.

EXAMPLE 97

*Bis-(Triamcinolone 16α,17α-Acetonide) 21,21'-Carbonate*

To a solution of 200 mg. of triamcinolone 16α,17α-acetonide in 6 ml. of anhydrous pyridine is added at 0° with stirring 2.5 ml. of a 10% solution of phosgene in toluene. The reaction is allowed to run at 0° for 20 minutes, after which time ice water is added. The resulting mixture is extracted with chloroform and the chloroform extract washed with water, 1 N sulfuric acid, water, dilute sodium bicarbonate and again with water. After drying with sodium sulfate the chloroform extract is evaporated to dryness in vacuo and the residual crystals (about 240 mg.) recrystallized from chlorform-95% ethanol. About 80 mg. of crystalline material is obtained posessing the following properties: M.P. greater than 340°;

$\lambda_{max.}^{Nujol}$ 2.87, 2.95, 5.65, 5.76, 6.02, 6.16 and 6.22μ.

*Analysis.*—Calcd. for: $C_{49}H_{60}O_{13}F_2$ (894.97): C, 65.75; H, 6.75; F, 3.87. Found: C, 65.85; H, 6.85; F, 3.96.

EXAMPLE 98

*Bis-(Triamcinolone 16α,17α-Acetonide) 21,21'-Sulfate*

By substituting an equivalent amount of sulfuryl chloride for the thionyl chloride in the procedure of Example 96, bis-(triamcinolone 16α,17α-acetonide) 31,21'-sulfate is obtained.

EXAMPLE 99

*Bis-(Triamcinolone 16α,17α-Acetonide) 21,21'-Phenylphosphonate*

By substituting an equivalent amount of phenylphosphonyl dichloride for the thionyl chloride in the procedure of Example 96, bis-(triamcinolone 16α,17α-acetonide) 21,21'-phenylphosphonate is obtained.

EXAMPLE 100

*Bis-(9α-Fluoro-16α-Hydroxyhydrocortisone 16α,17α-Acetonide) 21,21'-Sulfite*

Following the procedure of Example 96 but substituting an equivalent amount of 9α-fluoro-16α-hydroxyhydrocortisone 16α,17α-acetonide for the triamcinolone acetonide, bis-(9α-fluoro-16α-hydroxyhydrocortisone 16α,17α-acetonide)21,21'-sulfite is obtained.

EXAMPLE 101

*Potassium Salt of Triamcinolone 16α,17α-Acetonide-21-Phosphate*

To a mixture of 3 ml. of anhydrous pyridine and 0.15 ml. of phosphorous oxychloride maintained at −15° is added dropwise over a ten minute period a solution of 200 mg. of triamcinolone 16α,17α-acetonide in 3 ml. of pyridine. The resulting solution is allowed to remain at −15° for an additional 20 minutes at which time 0.2 ml. of water is added and the mixture is allowed to warm up to room temperature. One hour after the addition of water, the solution is concentrated in vacuo to about 2 ml. diluted with 10 ml. of water, extracted with chloroform and adjusted to a pH of 6.8 with potassium carbonate solution. The neutralized solution is lyophilized, triturated with alcohol and the alcoholic solution concentrated to small volume. The potassium salt of triamcinolone acetonide 21-phosphate crytsallizes under these conditions.

This invention may be variously otherwise embodied within the scope of the appended claims.

What is claimed is:

1. A compound selected from the group consisting of the 16,17-cyclic ketals of ketones and 16,17-cyclic acetals of aldehydes of at least two carbon atoms and steroids of the 16α,17α-dihydroxy-3,20-diketo-Δ⁴-pregnene series containing a substituent selected from the group consisting of β-hydroxy and keto in the 11-position.

2. 16,17-cyclic ketals of a steroid of the 9α-fluoro-11β, 16α,17α-trihydroxy-Δ⁴-pregnene series.

3. 16,17-cyclic acetals of a steroid of the 9α-fluoro-11β, 16α,17α-trihydroxy-Δ⁴-pregnene series and aldehydes of at least two carbon atoms.

4. 16,17-cyclic ketals of a steroid of the 9α-fluoro-11β, 16α,17α-trihydroxy-Δ¹,⁴-pregnadiene series.

5. 16,17-cyclic acetals of a steroid of the 9α-fluoro-11β, 16α,17α-trihydroxy-Δ¹,⁴-pregnadiene series and aldehydes of at least two carbon atoms.

6. A compound selected from the group consisting of steroids of the general formula

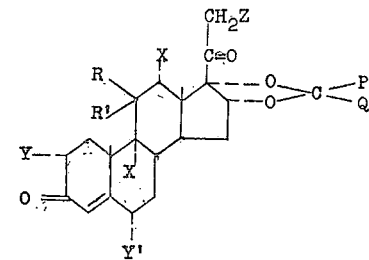

and the 1,2-dehydro and 6,7-dehydro derivatives thereof, wherein R is hydrogen, R' is β-hydroxy, and together R and R' is keto; X is selected from the group consisting of hydrogen, halogen, and lower alkyl, at least one X being hydrogen; Y and Y' are each selected from the group consisting of hydrogen and methyl; Z is selected from the group consisting of hydrogen, halogen, hydroxy and acyloxy; P is selected from the group consisting of hydrogen, lower alkyl, halo lower alkyl, carboxy lower alkyl, monocyclic cycloalkyl, monocyclic aryl, monocyclic aryl lower alkyl, monocyclic heterocyclic and monocyclic heterocyclic lower alkyl; Q is selected from the group consisting of lower alkyl, halo lower alkyl, carboxy lower alkyl, monocyclic cycloalkyl, monocyclic aryl, monocyclic aryl lower alkyl, monocyclic heterocyclic and monoclyclic heterocyclic lower alkyl; and together with the carbon atom to which they are joined P and Q is selected from the group consisting of cycloalkyl and monocyclic heretocyclic.

7. 16α,17α-lower alkylidene 9α-halo-16α-hydroxyprednisolone, wherein the alkylidene radical contains at least two carbon atoms.

8. 16α,17α-isopropylidene 9α-fluoro-16α-hydroxyprednisolone.

9. 16α,17α-lower alkylidene 9α-halo-16α-hydroxyhydrocortisone, wherein the alkylidene radical contains at least two carbon atoms.

10. 16α,17α-lower alkylidene 12α-halo-16α-hydroxyhydrocortisone wherein the alkylidene radical contains at least two carbon atoms.

11. 16α,17α-lower alkylidene 12α-halo-16α-hydroxyprednisolone, wherein the alkylidene radical contains at least two carbon atoms.

12. 16α,17α-lower alkylidene 12α-halo-Δ⁴-pregnene-11β,16α,17α-triol-3,20-dione, wherein the alkylidene radical contains at least two carbon atoms.

13. 16α,17α-phenyl-lower alkylidene 9α-halo-16α-hydroxyprednisolone.

14. Triamcinolone acetophenonide.

15. 16α,17α-lower alkylidene 9α-halo-11β,16α,17α-trihydroxyprogesterone, wherein the alkylidene radical contains at least two carbon atoms.

16. 16α,17α-lower alkylidene 9α-halo-Δ⁴-pregnene-16α,17α-diol,3,11,20-trione, wherein the alkylidene radical contains at least two carbon atoms.

17. The 16,17-ketal derivative of 9α-halo-16α-hydroxyprednisolone and an oxo lower alkanoic acid ester.

18. The 16,17-ketal derivative of triamcinolone and levulinic acid.

19. The 16,17-ketal derivative of 9α-halo-16α-hydroxyhydrocortisone and an oxo lower alkanoic acid ester.

20. 16α,17α-lower alkylidene 9α-halo-16α-hydroxyprednisolone 21-(lower alkanedioic acid), wherein the alkylidene radical contains at least two carbon atoms.

21. Triamcinolone acetonide 21-hemisuccinic acid.

22. An alkali metal salt of 16α,17α-lower alkylidene 9α-halo-16α-hydroxyprednisolone 21-(lower alkanedioic acid), wherein the alkylidene radical contains at least two carbon atoms.

23. Triamcinolone acetonide 21-sodium hemisuccinate.

24. 16α,17α-lower alkylidene 9α-halo-16α-hydroxyprednisolone 21-(lower alkane)sulfonate, wherein the alkylidene radical contains at least two carbon atoms.

25. 16α,17α-lower alkylidene 9α,21-dihalo-Δ¹,⁴-pregnadiene-11β,16α,17α-triol-3,20-dione, wherein the alkylidene radical contains at least two carbon atoms.

26. 16α,17α-lower alkylidene 9α-(lower alkyl)-16α-hydroxyprednisolone, wherein the alkylidene radical contains at least two carbon atoms.

27. 16α,17α-lower alkylidene 12α-(lower alkyl)-16α-hydroxyprednisolone, wherein the alkylidene radical contains at least two carbon atoms.

28. 16α,17α-lower alkylidene 9α-(lower alkyl)-16α-hydroxyhydrocortisone, wherein the alkylidene radical contains at least two carbon atoms.

29. 16α,17α-lower alkylidene 12α-(lower alkyl)-16α-hydroxyhydrocortisone, wherein the alkylidene radical contains at least two carbon atoms.

30. Bis-(16α,17α-lower alkylidene 9α-halo-16α-hydroxyprednisolone) 21,21'-sulfite, wherein the alkylidene radical contains at least two carbon atoms.

31. Bis-(16α,17α-lower alkylidene 9α-halo-16α-hydroxyprednisolone) 21,21'-carbonate, wherein the alkylidene radical contains two carbon atoms.

32. A process for increasing the physiological activity of steroids which comprises reacting a steroid of the 16α,17α-dihydroxy-3,20-diketo-Δ⁴-pregnene series containing a substituent selected from the group consisting of β-hydroxy and keto in the 11-position with a compound selected from the group consisting of aldehydes of at least two carbon atoms and ketones.

33. A process for preparing a compound selected from the group consisting of steroids of the general formula

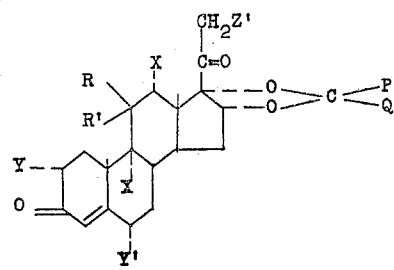

and the 1,2-dehydro and 6,7-dehydro derivatives thereof, wherein R is hydrogen, R' is selected from the group consisting of α-hydroxy, β-hydroxy and α-acyloxy, and together R and R' is keto; each X is selected from the group consisting of hydrogen, halogen, and lower alkyl, at least one X being hydrogen; Y and Y' are each selected from the group consisting of hydrogen and methyl; Z' is selected from the group consisting of hydrogen, halogen and hydroxy; P is selected from the group consisting of hydrogen, lower alkyl, halo lower alkyl, carboxy lower alkyl, monocyclic cycloalkyl, monocyclic aryl, monocyclic aryl lower alkyl, monocyclic heterocyclic and monocyclic heterocyclic lower alkyl; Q is selected from the group consisting of lower alkyl, halo lower alkyl, carboxy lower alkyl, monocyclic cycloalkyl, monocyclic aryl, monocyclic aryl lower alkyl, monocyclic heterocyclic and monocyclic heterocyclic lower alkyl; and together with the carbon atom to which they are joined P and Q is selected from the group consisting of cycloalkyl and monocyclic heterocyclic, which comprises interacting a corresponding compound selected from the group consisting of steroids of the general formula

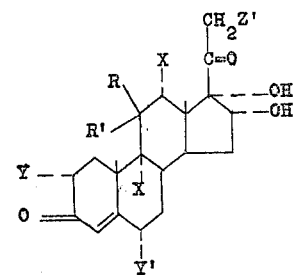

and the 1,2-dehydro and 6,7-dehydro derivatives thereof, wherein R, R', X, Y, Y' and Z' are as above defined, with a compound of the general formula

wherein P and Q are as above defined.

34. A process for preparing a compound selected from the group consisting of steroids of the general formula

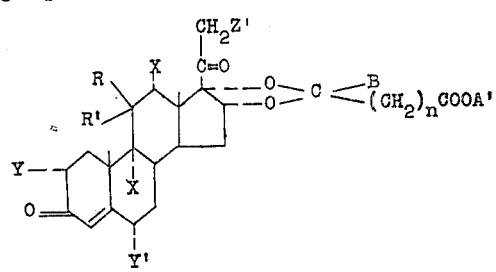

and the 1,2-dehydro and 6,7-dehydro derivatives thereof, wherein R is hydrogen, R' is selected from the group consisting of hydroxy and α-acyloxy, and together R and R' is keto; each X is selected from the group consisting of hydrogen, halogen, and lower alkyl, at least one X being hydrogen; Y and Y' are each selected from the group consisting of hydrogen and methyl; Z' is selected from the group consisting of hydrogen, halogen and hydroxy; $n$ is an integer less than six; A' is selected from the group consisting of hydrogen and lower alkyl; and B is selected from the group consisting of hydrogen and lower alkyl, which comprises interacting a corresponding compound selected from the group consisting of steroids of the general formula

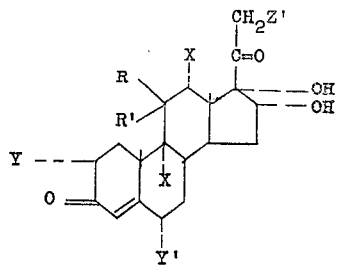

and the 1,2-dehydro and 6,7-dehydro derivatives thereof, wherein R, R', X, Y, Y' and Z' are as above defined, with a compound of the general formula:

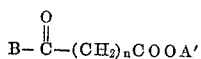

wherein $n$, A' and B are as above defined, in the presence of an acid catalyst, and recovering the resultant steroid.

35. An alkali metal salt of 16α,17α-lower alkylidene triamcinolone 21-phosphate.

36. A steroid of the formula

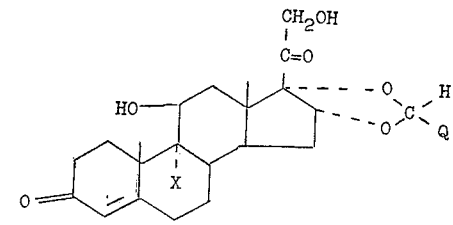

wherein X is halo and Q is halo lower alkyl.

37. A steroid of the formula

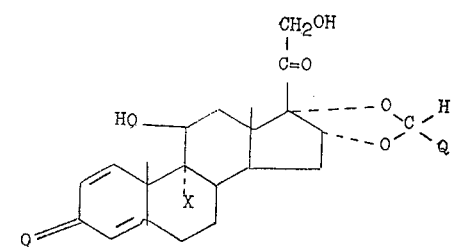

wherein X is halo and Q is halo lower alkyl.

References Cited in the file of this patent
UNITED STATES PATENTS

| | | |
|---|---|---|
| 2,584,271 | Huffman | Feb. 5, 1952 |
| 2,726,240 | Moffett | Dec. 6, 1955 |
| 2,736,732 | Knowles | Feb. 28, 1956 |

UNITED STATES PATENT OFFICE
CERTIFICATE OF CORRECTION

Patent No. 3,048,581                                            August 7, 1962

Josef Fried

It is hereby certified that error appears in the above numbered patent requiring correction and that the said Letters Patent should read as corrected below.

Column 28, lines 35, 37, 40 and 42, after "trihydroxy", each occurrence, insert -- -3,20-diketo --.

Signed and sealed this 8th day of March 1966.

(SEAL)
Attest:

ERNEST W. SWIDER                                        EDWARD J. BRENNER
Attesting Officer                                          Commissioner of Patents